US012533672B2

(12) United States Patent
Nauwynck et al.

(10) Patent No.: US 12,533,672 B2
(45) Date of Patent: Jan. 27, 2026

(54) SAMPLING DEVICE FOR BIOLOGICAL SPECIMEN

(71) Applicant: Universiteit Gent, Ghent (BE)

(72) Inventors: Hans Nauwynck, Lievegem (BE); Sebastiaan Theuns, Lier (BE); Sven Arnouts, Bertem (BE)

(73) Assignee: UNIVERSITEIT GENT, Ghent (BE)

( * ) Notice: Subject to any disclaimer, the term of this patent is extended or adjusted under 35 U.S.C. 154(b) by 250 days.

(21) Appl. No.: 17/617,812

(22) PCT Filed: Jun. 26, 2020

(86) PCT No.: PCT/EP2020/068027
§ 371 (c)(1),
(2) Date: Dec. 9, 2021

(87) PCT Pub. No.: WO2020/260583
PCT Pub. Date: Dec. 30, 2020

(65) Prior Publication Data
US 2022/0241775 A1 Aug. 4, 2022

(30) Foreign Application Priority Data
Jun. 28, 2019 (EP) ..................................... 19183233

(51) Int. Cl.
B01L 3/00 (2006.01)
A61B 10/00 (2006.01)
(Continued)

(52) U.S. Cl.
CPC ........ B01L 3/5029 (2013.01); A61B 10/0045 (2013.01); G01N 1/14 (2013.01);
(Continued)

(58) Field of Classification Search
CPC ........... B01L 3/5029; B01L 2300/0681; B01L 2300/0838; B01L 2400/049;
(Continued)

(56) References Cited

U.S. PATENT DOCUMENTS 4,978,504 A 12/1990 Nason
5,627,071 A 5/1997 Triva
(Continued)

FOREIGN PATENT DOCUMENTS

DE 10328984 A1 2/2004
DE 102005063572 B2 4/2013
(Continued)

OTHER PUBLICATIONS

International Search Report and Written Opinion mailed Sep. 21, 2020 in reference to co-pending European Patent Application No. PCT/EP2020/068027 filed Jun. 26, 2020.
(Continued)

Primary Examiner — Samuel P Siefke
(74) Attorney, Agent, or Firm — DINSMORE & SHOHL LLP

(57) ABSTRACT

The present invention is directed to a sampling device for the collection and isolation of a biological specimen from a sample or from a location. The sampling device comprises a swab tip and a support body wherein the support body has a hollow conformation with a first end and a second end and wherein said first end is in fluid connection with the internal surface of the swab tip. Typical for the present sampling device is that the swab tip comprises a filter material with a pore size that decreases from the external surface of the swab tip to the internal surface of the swab tip. The invention further also discloses the use of said sampling device and a method for the collection and isolation of a biological specimen.

20 Claims, 14 Drawing Sheets

(51) Int. Cl.
  *G01N 1/14* (2006.01)
  *G01N 1/02* (2006.01)
(52) U.S. Cl.
  CPC  *B01L 2300/0681* (2013.01); *G01N 2001/028* (2013.01); *G01N 2001/1445* (2013.01)
(58) Field of Classification Search
  CPC ........ A61B 10/0045; A61B 2010/0216; A61B 10/02; G01N 1/14; G01N 2001/028; G01N 2001/1445; G01N 1/02; A61F 13/38
  See application file for complete search history.

(56) References Cited

U.S. PATENT DOCUMENTS

| | | | |
|---|---|---|---|
| 6,375,856 B1* | 4/2002 | Seshimoto | G01N 1/4077 210/488 |
| 2004/0022687 A1* | 2/2004 | Wuske | A61B 10/0051 422/400 |
| 2009/0012425 A1 | 1/2009 | Dodge et al. | |
| 2009/0030341 A1* | 1/2009 | Kshirsagar | G01N 1/38 600/572 |

FOREIGN PATENT DOCUMENTS

| | | |
|---|---|---|
| DE | 102005063572 B3 | 4/2013 |
| WO | 2004003515 A3 | 1/2004 |
| WO | 2004086979 A1 | 10/2004 |
| WO | 2005032377 A1 | 4/2005 |
| WO | 2012093350 A1 | 7/2012 |

OTHER PUBLICATIONS

Extended European Search report in reference to co-pending European Patent Application No. 19183233 filed Jun. 26, 2019.

Conceição-Neto, et al., "Modular approach to customise sample preparation procedures for viral metagenomics: a reproducible protocol for virome analysis", Scientific Reports, vol. 5, pp. 1-14, 2015.

Ellis, et al., "Isolation of circovirus from lesions of pigs with postweaning multisystemic wasting syndrome", Can Vet Journal, vol. 39, pp. 44-51, Jan. 1998.

Frydas, et al., "Different clinical, virological, serological and tissue tropism outcomes of two new and one old Belgian type 1 subtype 1 porcine reproductive and respiratory virus (PRRSV) isolates", Veterinary Research, vol. 46, No. 37, pp. 1-17, 2015.

Garré, et al., "In vitro susceptibility of six isolates of equine herpesvirus 1 to acyclovir, ganciclovir, cidofovir, adefovir, PMEDAP and foscarnet", Veterinary Microbiology, vol. 122, pp. 43-51, 2007.

Qiu, et al., "Cross-protection against European swine influenza viruses in the context of infection immunity against the 2009 pandemic H1N1 virus: studies in the pig model of influenza", Veterinary Research, vol. 46, No. 105, pp. 1-10, 2015.

Theuns, et al., "Porcine group a rotaviruses with hetergeneous VP7 and VP4 genotype combinations can be found together with enteric bacteria on Belgian swine farms", Veterinary Microbiology, vol. 172, pp. 23-34, 2014.

Theuns, et al., "Complete Genome Characterization of Recent and Ancient Belgian Pig Group A Rotaviruses and Assessment of Their Evolutionary Relationship with Human Rotaviruses", Journal of Virology, vol. 89, No. 2, pp. 1043-1057, 2015.

European Search Report issued by the European Patent Office for European Patent Application No. 19183233.6 dated Dec. 12, 2019 (8 total pages).

International Search Report and Written Opinion issued by the European Patent Office acting as International Searching Authority for International Patent Application No. PCT/EP2020/068027 dated Sep. 21, 2020 (14 total pages).

* cited by examiner

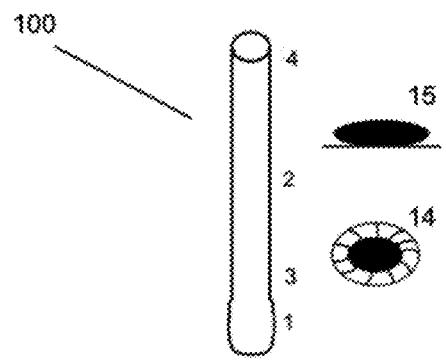
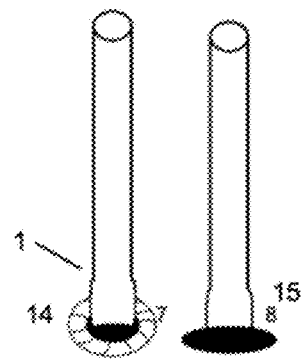
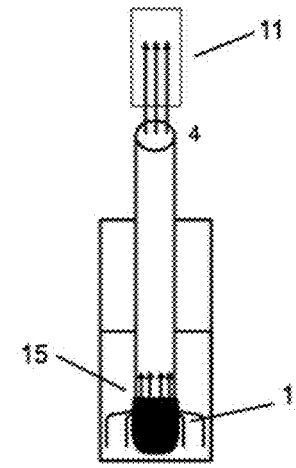
FIG. 3A          FIG. 3B          FIG. 3C
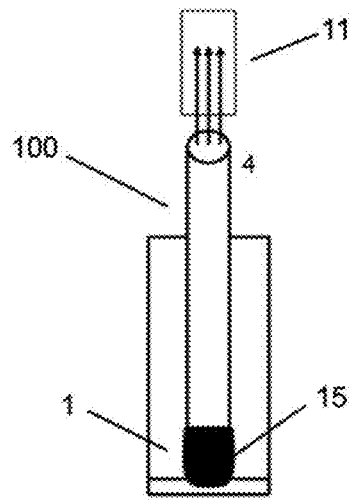
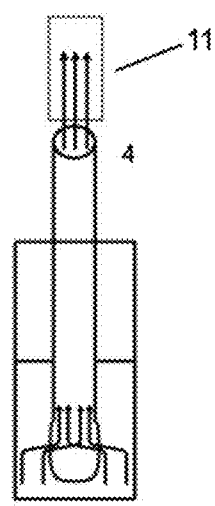
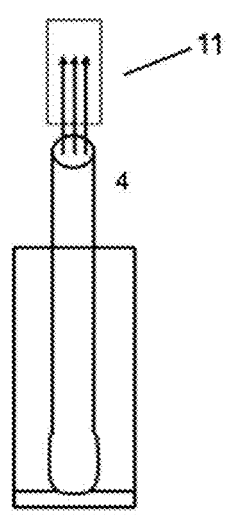
FIG. 3D          FIG. 3E          FIG. 3F

FIG. 12

FIG. 13

SAMPLING DEVICE FOR BIOLOGICAL SPECIMEN

CROSS REFERENCES TO RELATED APPLICATIONS

This application is a national-stage application under 35 U.S.C. § 371 of International Application No. PCT/EP2020/068027, filed Jun. 26, 2020, which International Application claims benefit of priority to European Patent Application No. 19183233.6, filed Jun. 28, 2019.

FIELD OF THE INVENTION

The present invention lies in the field of sampling devices for biological specimen. In particular, the present invention is directed to a sampling device for simultaneous collection, isolation and purification of a biological specimen from a sample or from a location. The application further relates to a method for the collection, isolation and purification of a biological specimen from a sample or from a location using said sampling device.

BACKGROUND TO THE INVENTION

The diagnostic market is standing for a revolution with the development of the 'lab-on-a-chip' technology enabling the performance of PCR, immunoassays, complete cell counts, clinical chemistry and sequencing on handheld devices. While such groundbreaking technologies will become increasingly available, a major hurdle of diagnostic accuracy and speed still lies in sample collection and purification. This holds true for point-of-care of diagnostics, but is even more important for diagnostic samples sent to reference laboratories. Due to the long time between the collection of samples of complex matrices like blood, feces, and sputum, including amongst other bacteria and enzymes, and arrival at the reference laboratory, partial or complete degradation of pathogens may already have occurred. Standardization of sample collection methodologies is often lacking, which leads to inaccurate results because of several reasons: improper collection methodologies, over dilution of samples, poor storage conditions (temperature, time, leakage), bacterial overgrowth, hemolysis in sera, (partial) degeneration of infectious agents and disintegration of pathogens' nucleic acids. Diagnostic matrices such as faeces, respiratory secretions, blood, urine and semen also contain impurities and substances (e.g. heme and metabolites, acidic polysaccharides, bile salts, lipids . . . ) which have known inhibitory effects on downstream diagnostics such as (real-time) PCR and sequencing. Furthermore, intracellular pathogens, hiding in white blood cells and thus requiring cell lysis, are often missed by routine diagnostics.

The use of next- and third-generation sequencing technologies also becomes more important for diagnostics and will replace many of the currently existing PCR-based assays on the long term. Respiratory and enteric disease problems are mostly the result of a complex of different pathogens including viruses and bacteria. Simultaneous detection of all pathogens, known and novel, present in a sample is only possible using metagenomics. Here, the genomes of pathogens are sequenced and compared to reference databases to see if certain pathogens are present or not. Meanwhile, full genomes can be assembled to provide strain information to adapt prevention/therapeutic actions. This is impossible with other diagnostic procedures.

A hurdle for its widespread use in the field is the typical low abundance of viral nucleic acids in a sample compared to host and bacterial genomes. Viral enrichment strategies are needed to make sure viruses instead of background host and bacterial sequences are analyzed. Such protocols include a low-speed centrifugation or ultracentrifugation step, a filtration step and nuclease treatment.

There is a need for devices that enable purification of pathogens in a sample, wherein the pathogens are no longer exposed to degradation induced by noxious elements in the different matrices and wherein said pathogens can be more precisely analyzed in downstream diagnostic procedures.

Currently available devices for sample collections include the classical swab devices for collection of clinical samples (e.g. as disclosed in U.S. Pat. No. 5,627,071, WO04/003515, WO04/086979, WO05/032377 and WO12/093350).

The present invention provides a sampling device enabling standardization of sample collection and transportation and reducing the time for sample preparation and the time-interval between sample collection and diagnosis.

SUMMARY OF THE INVENTION

The present invention is directed to a sampling device (100) for the aspiration of samples, in particular for collection, isolation and/or purification of a biological specimen from a sample or from a location. In particular, the sampling device (100) according to the different embodiments of the invention specifically allows the simultaneous collection, isolation and/or purification of a biological specimen using only one handling action. Typical for the present invention is that during collection of the sample with the sampling device, the biological specimen can be immediately collected and transferred via the support body of the sampling device into a collection tube for further analysis. Thus, in some applications of the sampling device it is not essential to re-immerse the sampling device in a collection fluid to release (a fluid) biological specimen of interest into said collection fluid. As a result, sample quality is retained and loss of material is reduced. Optionally, the sampling device of the present invention can still be immersed in a collection fluid to dissolve the biological specimen of interest, for example mucus, blood or faeces, into said collection fluid, followed by immediate collection and transfer of the biological specimen via the swab tip and support body of the sampling device into a collection tube.

The present invention discloses a sampling device (100) for collecting and isolating a biological specimen from a sample or from a location, said sampling device comprising a swab tip (1) and a support body (2), wherein the support body has a hollow conformation with a first end (3) and a second end (4), and wherein said first end is in fluid connection with the swab tip, and more specific with the internal surface of the swab tip. Said sampling device is typically characterized in that the swab tip comprises a filter material (8, 9) with a pore size that decreases from the external surface of the swab tip to the internal surface of the swab tip and in that the support body (2) is configured to collect the sample via the sample tip (1) and to transport the sample from its first end (3) towards its second end (4). In another embodiment, the sampling device of the present invention is typically characterized in that the swab tip comprises a filter material (8, 9) with an average pore size that decreases from the external surface of the swab tip to the internal surface of the swab tip and wherein the support body (2) is configured to collect the sample via the sample tip (1) and to transport the sample from its first end (3) towards its second end (4).

In a further embodiment, the sampling device according to the present invention further comprises means for creating a pressure gradient through the sampling device, in particular means for creating a negative pressure gradient through the sampling device, thereby facilitating the transport of the sample from the sample tip (1) towards the second end (4) of the support body via the first end (2) of the support body. Such means for creating a pressure gradient can be a standard or non-standard syringe device. Though, other aspiration devices capable of achieving a pressure gradient may also be used, including, but not limited to, standard suction devices, air pumping apparatuses, vacuum devices, etc. In still another embodiment, the means for creating a pressure gradient, in particular a negative pressure gradient, also function as a collection tube; for example in said instance, the means for creating a pressure gradient, in particular a negative pressure gradient, are a syringe in which the sample of interest is collected.

The swab tip according to the present invention is typically characterized in that it comprises a filter material (8, 9) with a pore size that decreases from the external surface of the swab tip to the internal surface of the swab tip and wherein the pore size of said filter material is at least 5 µm, preferably at least 10 µm. The swab tip according to the present invention is also typically characterized in that it comprises a filter material (8, 9) with an average pore size that decreases from the external surface of the swab tip to the internal surface of the swab tip and wherein the pore size of said filter material is at least 5 µm, preferably at least 10 µm.

In another aspect of the invention, the filter material of the swab tip is a single-layered filter material (8). In an even further embodiment, said filter material is a single-layered filter material with a continuous pore size gradient. In said aspect, the pore size continuously and gradually decreases from the external surface of the swab tip to the internal surface of the swab tip.

In another aspect of the invention, the filter material of the swab tip is a multi-layered filter material (9). In a further aspect, the multi-layered filter material has a discontinuous pore size gradient. The multi-layered filter material according to the present invention thus comprises 2 or more layers (5, 6) wherein the pore size of each layer decreases from the external surface of the swab tip to the internal surface of the swab tip. The pore size thus decreases from the external layer of the swab tip towards the internal layer of the swab tip. In other words, each layer of said multi-layered filter material comprises a specific average pore size wherein said specific average pore size decreases from the external surface of the swab tip to the internal surface of the swab tip. Or stated differently, each layer of said multi-layered material comprises a specific average pore size wherein said specific average pore size of the external layer is larger than the average pore size of the middle and/or internal layers. As such, the average pore size of the internal layer is smaller than the average pore size of the external and/or middle layers. In a further aspect, said multi-layered filter material comprises 2, 3, 4, or 5 layers. In a more preferred embodiment, the filter material is a multi-layered filter material comprising 2 or 3 layers.

As already outlined above, the sample tip of the sampling device according to the present invention comprises a filter material with a pore size that decreases from the external surface of the swab tip to the internal surface of the swab tip. In some aspects of the invention, said filter material is a multi-layered filter material (9). In still a further embodiment, the pore size of the outer layer of said multi-layered material is at least 50 µm; preferably at least 100 µm. In yet another embodiment, the pore size of the inner layer of said multi-layered material is between 50 µm and 5 µm. In still a further embodiment, the filter material comprises a pore size gradient with an inner pore size of 5-50 µm; preferably 10-50 µm, and an outer pore size of 50-100 µm.

In a further aspect of the invention, the swab tip of the sampling device further comprises a (fabric) layer (7) on the external surface of the swab tip. In still a further embodiment, said layer (7) comprises pores wherein the pore size is at least 100 µm; preferably at least 200 µm.

Thus, in some embodiments of the invention, the sampling device of the present invention comprises a swab tip and a support body, according to the different embodiments, and wherein the swab tip comprises a filter material with a pore size that decreases from the external surface of the swab tip to the internal surface of the swab tip. In another embodiment, the filter material has an average pore size that decreases from the external surface of the swab tip to the internal surface of the swab tip. Supplementary to said filter material, the swab tip further comprises a (fabric) layer on its external surface. In said instance, the pore size of said layer is larger than or equally to the largest pore size of the filter material. In a particular embodiment, the pore size of the fabric layer is at least 100 µm; preferably at least 200 µm.

In another embodiment, the swab tip according to the present invention is typically characterized in that it comprises a filter material (8, 9) that has a density that increases from the external surface of the swab tip to the internal surface of the swab tip. In one aspect, the density of the filter material is at least 50 g/m$^2$, preferably at least 60 g/m$^2$, even more preferably at least 80 g/m$^2$.

In another aspect of the invention, the filter material of the swab tip is a single-layered filter material (8) with a density that continuously and gradually increases from the external surface of the swab tip to the internal surface of the swab tip.

In another aspect of the invention, the filter material of the swab tip is a multi-layered filter material (9), wherein density in each layer increases from the external surface of the swab tip to the internal surface of the swab tip. In a further aspect, said multi-layered filter material comprises 2, 3, 4, or 5 layers. In a more preferred embodiment, the filter material is a multi-layered filter material comprising 2 or 3 layers.

As already outlined above, the sample tip of the sampling device according to the present invention comprises a filter material with a density that increases from the external surface of the swab tip to the internal surface of the swab tip. In some aspects of the invention, said filter material is a multi-layered filter material (9). In still a further embodiment, the density of the outer layer of said multi-layered material is maximum 200 g/m$^2$, preferably maximum 190 g/m$^2$. In yet another embodiment, the density of the outer layer of said multi-layer material is between 100 g/m$^2$ and 200 g/m$^2$. In a preferred embodiment, the density of the outer layer of said multi-layer material is 190 g/m$^2$; in another preferred embodiment, the density of the outer layer of said multi-layer material is 115 g/m$^2$.

In another embodiment, the density of the inner layer of said multi-layered material is maximum 400 g/m$^2$; preferably maximum 300 g/m$^2$. In another embodiment, the density of the inner layer of said multi-layered material is between 200 g/m$^2$ and 400 g/m$^2$. In a specific embodiment, the density of the inner layer of said multi-layered material is 115 g/m². In another specific embodiment, the density of the inner layer of said multi-layered material is 190 g/m².

In still another embodiment, the sampling device comprising a sample tip with a filter material as described herein above, further comprises an additional layer on the external side of the sample tip, which e.g. has a "scraping" function facilitating the sample collection. Said additional layer has a density of at least 50 g/m², preferably at least 60 g/m², even more preferably at least 80 g/m². In another embodiment, said additional layer has a density between 50 g/m² and 100 g/m²; preferably a density between 80 g/m² and 100 g/m².

As already outlined above, the first end of the support body of the sampling device is in fluid connection with the internal surface of the swab tip. Typically, the support body (2) of the sampling device (100) is configured to collect the sample via the sample tip (1) and to transport the sample from its first end (3) towards its second end (4). In a further embodiment, the first end of the support body terminates in an open tip. In another embodiment, the first end of the support body terminates in a closed tip. In still another embodiment, the first end of the support body further comprises one or more openings (10) in the side walls thereof. Thus, in a still more specific embodiment, the first end of the support body terminates in an open tip and further comprises one or more openings in its side walls. In another specific embodiment, the first end of the support body terminates in a closed tip and further comprises one or more openings in the side walls of the first end of the support body.

Typical for the present invention is that the biological specimen to be collected and purified is transferred through the filter material of the swab tip (e.g. by aspiration) into the hollow support body (2). Therefore, in a further embodiment, the sampling device of the present invention further comprises a collection tube (11) that is in fluid connection with the second end (4) of the support body (2). In still a further and more specific embodiment, one or more filters (12) can be positioned in between the support body (2) and said collection tube (11). In yet another embodiment, the support body (2) and the collection tube (11) are the same. In still another embodiment, the support body (2) is also a means for creating a pressure gradient (13), in particular means for creating a negative pressure gradient (13). In still another further embodiment, the support body (2) that functions as a means for creating a pressure gradient (13) is also a collection tube (11). For example, in said embodiment, the support body is a syringe device.

The present invention also discloses the use of a sampling device according to all possible embodiments as disclosed herein. In particular, the use of said sampling device for the collection and isolation of a biological specimen from a sample from a subject or from a location is disclosed.

The present invention further provides a method for the collection and isolation of a biological specimen from a sample or from a location. Said method comprises the following steps:

scraping with and/or immersing the external surface of the swab tip (1) of the sampling device (100) according to the present invention in the sample or at a location;
collection of a biological specimen from the sample or the location in the external surface of said swab tip;
transfer of the biological specimen from the external surface of the swab tip to the internal surface of the swab tip (1) and further into the support body (2) of said sampling device; and
collection of the biological specimen in the support body or from the second end of the support body of said sampling device into a collection tube (11) that is fluidly connected with the second end (4) of the support body (2),
wherein the collection and isolation of the biological specimen is performed using a negative pressure gradient that facilitates the transport of the sample from the sample tip towards the second end of the support body via the first end of the support body.

The pressure gradient can be generated by any means for creating a pressure gradient. Such means can be a standard syringe device. Though, other devices capable of achieving a pressure gradient may also be used, including, but not limited to, standard suction device, air pumping apparatuses, vacuum devices, etc. In another embodiment, said means for creating a pressure gradient function as a collection tube (11).

In a further embodiment, the method comprises the following steps:

scraping with and/or immersing the external surface of the swab tip (1) of the sampling device (100) according to the present invention in the sample or at a location;
collection of a biological specimen from the sample or the location in the external surface of said swab tip;
optionally bringing the swab tip and the collected biological specimen in a liquid medium;
transfer of the biological specimen through the swab tip (such as from the external surface of the swab tip to the internal surface of the swab tip) and further into the support body of said sampling device;
collection of the biological specimen from the support body of said sampling device into a collection tube (11),
wherein the collection and isolation of the biological specimen is performed using a pressure gradient.

In still another embodiment, the present invention provides a method for the collection and isolation of a biological specimen from a sample or from a location, said method comprising the following steps:

scraping with and/or immersing the external surface of the swab tip (1) of the sampling device (100) according to the present invention in the sample or at a location thereby collecting a biological specimen in the sample tip;
connecting the support body (2) of the sampling device to a collection tube (11) wherein the collection tube is in fluid connection with the second end of the support body (2) and optionally one or more filters that are positioned in between the support body (2) and the collection tube (11) and wherein the collection tube is filled with a fluid;
releasing the fluid from the collection tube via the one or more filters, the support body (2) and the swab tip into a collection container by using a positive pressure gradient;
re-collecting the biological specimen and the fluid from the collection container by using a negative pressure gradient.

In a further aspect of said method, the pressure gradient can be generated by any means that is able to create a positive and a negative pressure gradient. Such means can be a standard syringe device. Though, other devices capable of achieving a pressure gradient may also be used, including, but not limited to, standard suction device, air pumping apparatuses, vacuum devices, etc. In another embodiment, said means for creating a pressure gradient function as a collection tube (11).

In a further aspect of said method, the fluid present in the collection tube is any fluid that ensures a good solubility of the biological specimen. In a particular embodiment, said fluid is selected from saline, water, a buffered solution, a pathogen transport medium or any other standard rinsing buffer.

In all possible embodiments of the present invention, the biological specimen to be collected and isolated can be any biological specimen, preferably the biological specimen is selected from bacteria, viruses, parasites, archaea, fungi and yeasts, in particular bacteria and viruses.

Finally, in all different aspects of the invention, the sample from which the biological specimen is to be collected and isolated, can be a water sample or a bodily fluid sample. In a further aspect, the water sample is selected from fresh water, salt water, brackish water, waste water. In still another aspect, the bodily fluid sample is selected from blood, serum, plasma, nasal mucus, sputum, lung aspirate, vaginal fluid, gastric fluid, saliva, urine, faeces, cerebrospinal fluid, breast milk, pus. In still another aspect, said bodily fluid sample is collected from a subject. In still another aspect, the sample from which the biological specimen is to be collected and isolated is selected from solid tumors, warts, sarcoids or fibromas. In said instance, the surface of the sample is swept with the sample tip of the sampling device in order to collect the biological specimen. For example, in said aspect, papillomaviruses can be collected from sarcoids in horses.

The subject is selected from a human or a non-human animal; preferably from a human, a non-human mammal, or a non-mammal. Non-human mammals are selected from non-human primates, rodents (e.g. mouse or rats), canines, felines, equines, bovines, camelids, ovines, porcines, etc. Non-mammals are selected from birds, chicken, bats, fish, mussels, shrimps, prawns, crustaceans, amphibians, reptiles, etc. The present invention finds use in research as well as agriculture (plant related), veterinary or human medical or non-medical applications.

BRIEF DESCRIPTION OF THE DRAWINGS

With specific reference now to the figures, it is stressed that the particulars shown are by way of example and for purposes of illustrative discussion of the different embodiments of the present invention only. They are presented in the cause of providing what is believed to be the most useful and readily description of the principles and conceptual aspects of the invention. In this regard no attempt is made to show structural details of the invention in more detail than is necessary for a fundamental understanding of the invention. The description taken with the drawings making apparent to those skilled in the art how the several forms of the invention may be embodied in practice.

(FIG. 1A) General schematic drawing; (FIG. 1B) schematic drawing of a sampling device comprising a multi-layered filter material with discontinuous pore size gradient; (FIG. 1C) schematic drawing of a sampling device comprising a single-layered filter material with a continuous pore size gradient.

(FIG. 2A) General schematic drawing; (FIG. 2B) schematic drawing of a sampling device comprising a multi-layered filter material with discontinuous pore size gradient and several openings in the side wall of first end of the support body; (FIG. 2C) schematic drawing of a sampling device comprising a single-layered filter material with a continuous pore size gradient and several openings in the side wall of first end of the support body.

FIGS. 3A, 3B, 3C, 3D, 3E, 3F: Schematic overview showing the method for collection and isolation of a biological specimen from a sample according to an embodiment of the present invention, and using a sampling device according to the present invention.

(FIG. 11A) PRRSV, Influenza and adenovirus infectivity upon spiking of different dilutions in respiratory mucus and sample collection with a cotton swab (black) and the complete sampler (white). Mean infective virus titer ($CCID_{50}$/swab)±standard deviation of three independent experiments are shown for each virus. (FIG. 11B) Influenza virus infectivity upon spiking (undiluted and 1/10 dilution) and collection with a cotton swab (condition A), the sampling device of the present invention (swab tip, support body) with 5 µm and 0.8 µm SFCA filters and a collection tube (condition B), and the sampling device (swab tip and support body) of the present invention (condition C)

Figures 12, 13:
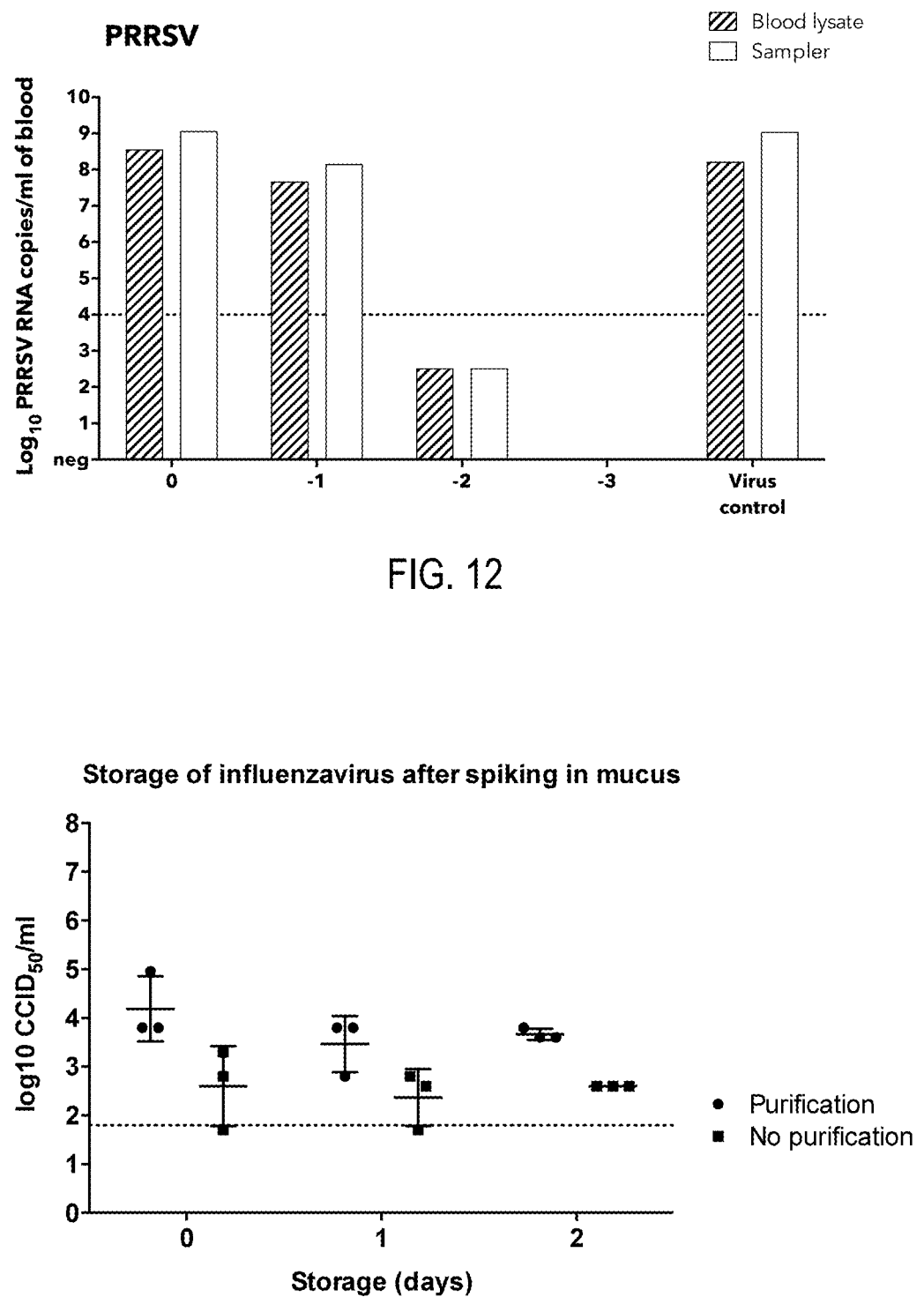

FIG. 12: PRRSV genome copies quantified upon spiking of blood with different concentrations of virus. Black bars represent the results for samples that were obtained from blood lysate, without filtration. White bars represent the results obtained upon collection with the sampler. The dotted line represents the limit of quantification of the real-time PCR.

FIG. 13: Effect of purification and time on influenza virus infectivity. Individual replicates for each time point are shown with dots (purified with syringe filters) or squares (no purification of the mucus suspension). Mean and standard deviations are shown by the bar and flags. The limit of detection of the titration is shown with the dotted line.

Figure 14:
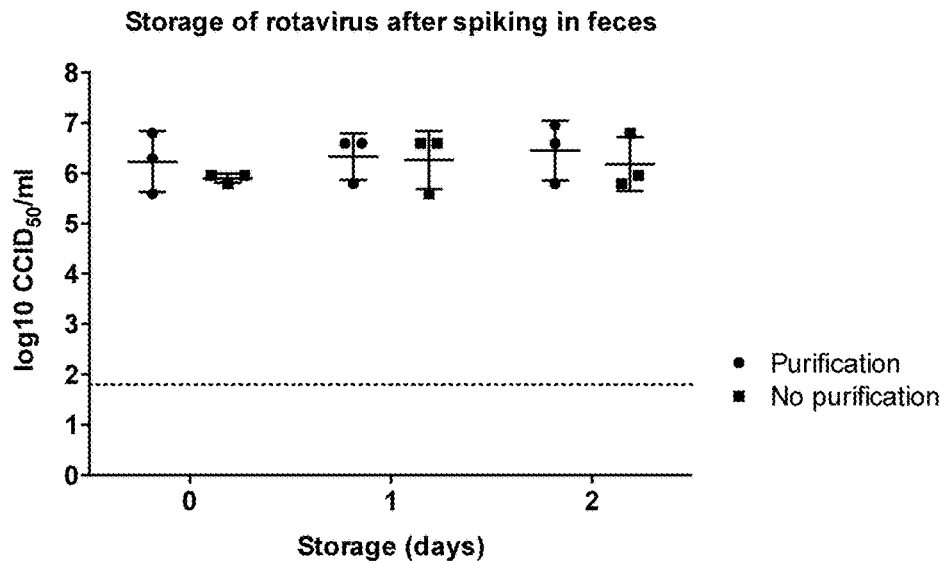

FIG. 14: Effect of purification and time on rotavirus virus infectivity. Individual replicates for each time point are shown with dots (purified with syringe filters) or squares (no purification of the mucus suspension). Mean and standard deviations are shown by the bar and flags. The limit of detection of the titration is shown with the dotted line.

Figure 15:
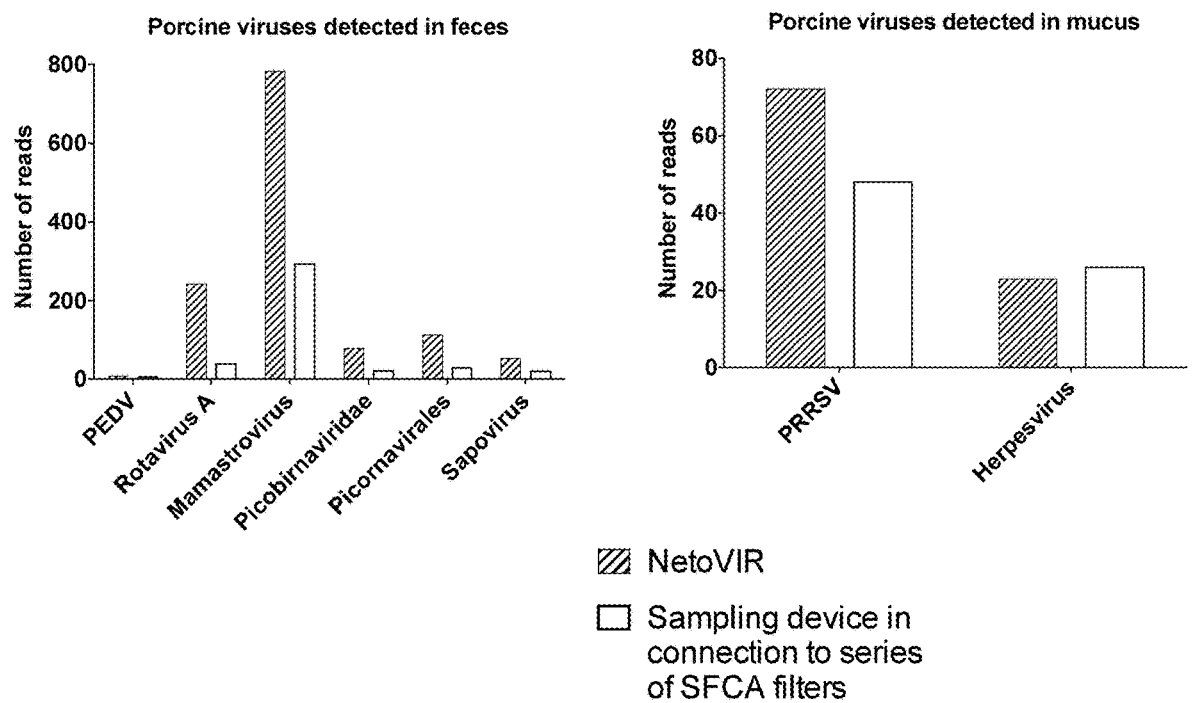

FIG. 15: Direct applicability of the sampling device of the present invention in a viral metagenomics pipeline. Fecal and mucus samples were spiked with representative viruses and processed with the sampling device of the present invention in connection to a series of 5 µm and 0.8 µm surfactant-free cellulose acetate filters (white bars) or a standardized viral metagenomics protocol as described by Conceição-Neto et al., 2015 (black bars). Upper panel shows the total number of reads and the fraction of viral reads generated during sequencing. The middle and lower panel show the further taxonomical classification of the viral reads.

Figure 16A:
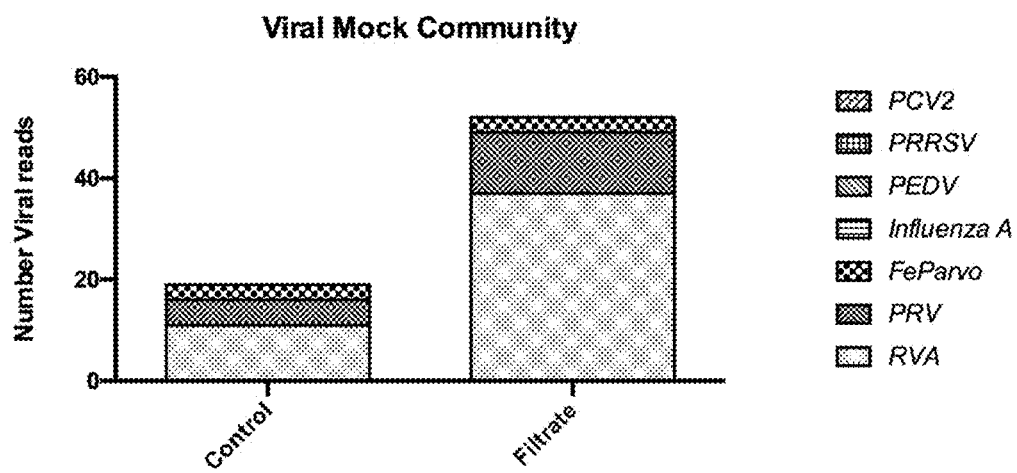
Figure 16B:
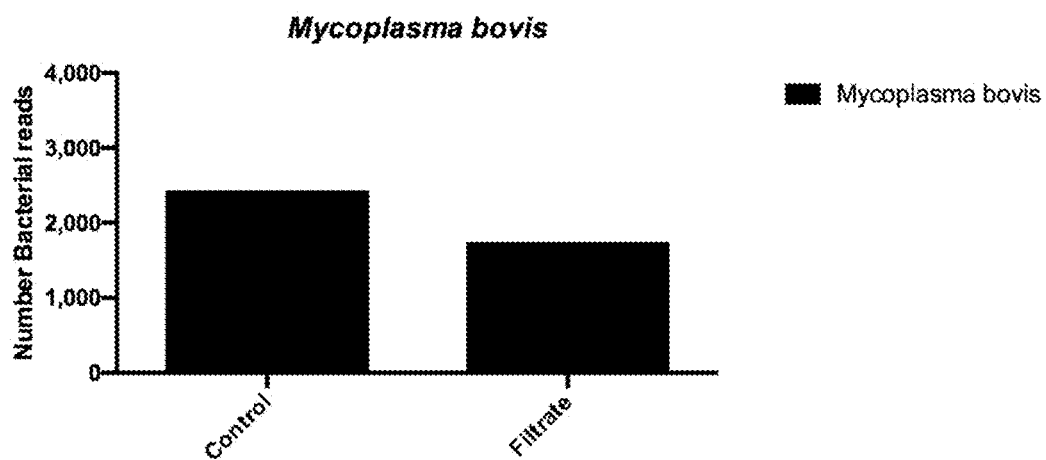
Figure 16C:
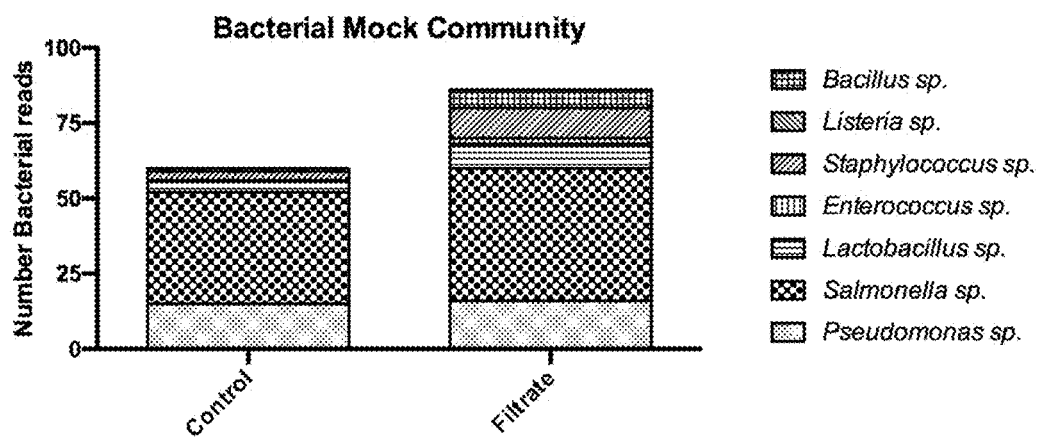

FIGS. 16A, 16B, 16C: Enrichment of spiked viruses (FIG. 16A), *Mycoplasma* spp. (FIG. 16B) and bacteria (FIG. 16C) from sputum collected with the sampling device of the present invention.

DETAILED DESCRIPTION OF THE INVENTION

As used herein, the singular forms "a", "an", and "the" include both singular and plural referents unless the context clearly dictates otherwise. The terms "comprising", "comprises" and "comprised of" as used herein are synonymous with "including", "includes" or "containing", "contains", and are inclusive or open-ended and do not exclude additional, non-recited members, elements or method steps. The term "about" as used herein when referring to a measurable value such as a parameter, an amount, a temporal duration, and the like, is meant to encompass variations of +/−20% or less, preferably +1-10% or less, more preferably +/−5% or less, of and from the specified value, insofar such variations are appropriate to perform in the disclosed invention. It is to be understood that the value to which the modifier "about" refers is itself also specifically, and preferably, disclosed. Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any >3, >4, >5, >6 or >7 etc. of said members, and up to all said members. All references, and teachings specifically referred to, cited in the present specification are hereby incorporated by reference in their entirety. Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. Reference throughout this specification to "one embodiment" or "an embodiment" means that a particular feature, structure or characteristic described in connection with the embodiment is included in at least one embodiment of the present invention.

Current sampling devices for collection of biological specimens typically comprise a sample tip and a support body, wherein the sample tip can be used to scrape or immerse in the sample to be collected, and wherein the biological specimen of interest is first collected on the sample tip, where after the sample tip has to be immersed in a collection fluid to release the specimen in said fluid. Although these devices are widely used, they often require additional steps for further isolation or purification, such as ultracentrifugation, etc. In addition, the separate handling of the collection fluid also increases the risk for additional contamination and/or loss of specimen material.

The sampling device (also referred to herein as "sampler") according to the present invention allows the simultaneous collection, isolation and/or purification of a biological specimen from a sample requiring only limited handling action. This device saves processing time at laboratories and improves accuracy (specificity and sensitivity) of analyses. In particular, and in contrast with prior art sampling devices, the biological specimen can be immediately collected and transferred via a swab tip and through the support body of the sampling device into a collection tube. With the present invention, there is no need to re-immerse the sampling device in a collection fluid to release a biological specimen in said collection fluid for further analysis. As such, no additional handlings, such as use of additional plungers, further excipients, etc., are required to collect the sample for further analysis, and thus the risk for additional contamination and/or degeneration or loss of specimen material leading to inaccurate testing is reduced with the present device and method. Further, the device and methods of the present invention allow collection and analysis of samples on site and in a fast and standardized manner. Optionally, the sampling device of the present invention can still be immersed in a collection fluid to dissolve the biological specimen of interest, e.g. when cell lysis is required, or when the biological specimen is a non-fluid, for example mucus or faeces, into said collection fluid, followed by immediate collection and transfer of the biological specimen via the swab tip and support body of the same sampling device into a collection tube.

In addition, by using a filter material in the swab tip, unwanted and larger particles are prevented to be collected, and a selection based on the size of the biological specimen can be made as well.

Figure 1A:
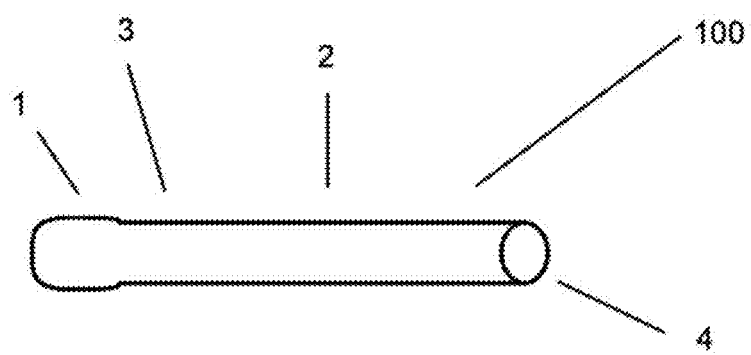
FIGS. 1A, 1B, 1C: Schematic overview of a sampling device according to different embodiments of the present invention.
Figure 1B:
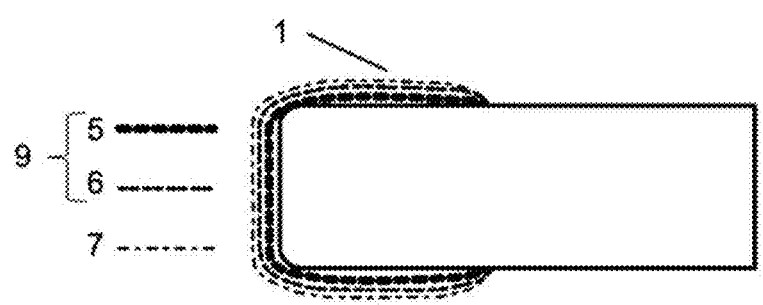
Figure 1C:
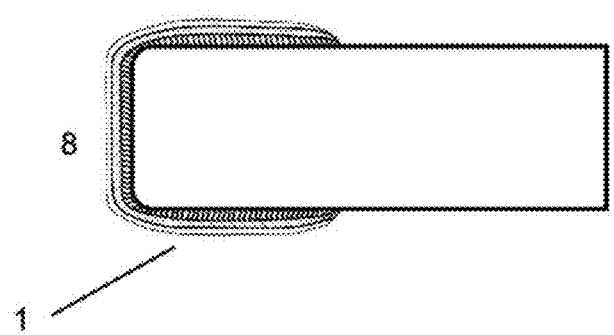

The sampling device (100) of the present invention is typically characterized in that it comprises a swab tip (1) and a support body (2), wherein the support body has a hollow conformation with a first end (3) and a second end (4), and wherein said first end is in fluid connection with the internal surface of the swab tip (FIG. 1A). Additionally, the swab tip comprises a filter material (8, 9) with a pore size that decreases from the external surface (such as the surface in contact with the sample) of the swab tip to the internal surface of the swab tip (such as the surface in open contact with the support body), more specific in the direction of the fluid or sample flow (FIGS. 1B-1C). Further, the support body (2) is configured to collect the sample via the sample tip (1) and to transport the sample from its first end (3) towards its second end 4).

Figure 2A:
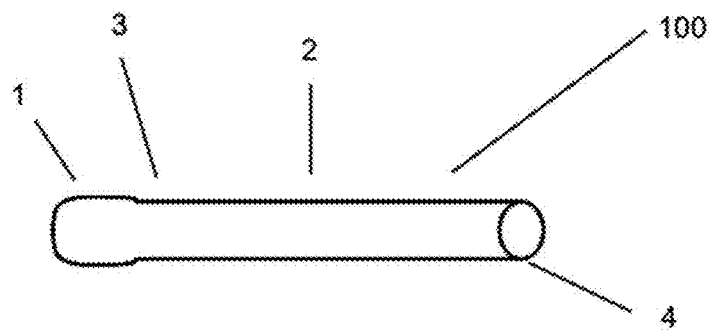
FIGS. 2A, 2B, 2C: Schematic overview of a sampling device according to different embodiments of the present invention.
Figure 2B:
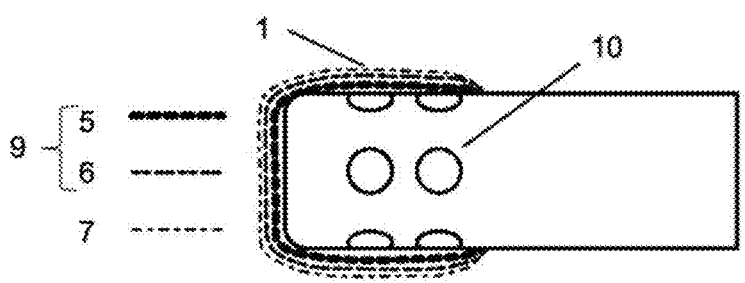
Figure 2C:
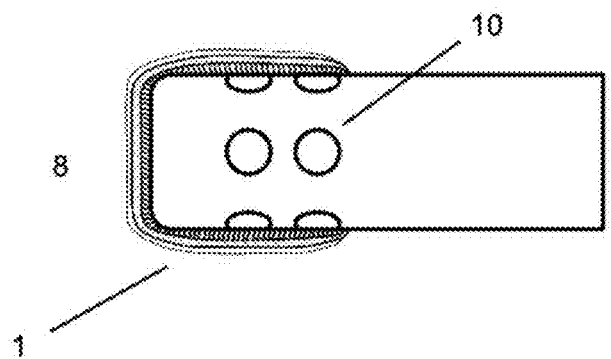

In another embodiment, the first end of the support body further comprises one or more openings (10) in the side walls thereof (FIGS. 2A-2C). Thus, in a still more specific embodiment, the first end of the support body terminates in an open tip and further comprises one or more openings in its side walls. In another specific embodiment, the first end of the support body terminates in a closed tip and further comprises one or more openings in the side walls of the first end of the support body.

As said, the support body (2) of the present sampling device has a hollow conformation, and thereby allows the biological specimen (15) to be transferred from the internal surface of the swab tip into said support body, and further via the support body into a collection tube (11). In one embodiment, the support body and the collection tube are the same. The support body therefore has a hollow conformation that can be of any shape or design (e.g. cylindrical, hexagonal, etc.). In a preferred embodiment, the support body has an elongate conformation and/or a substantially rod-shaped conformation. For example, the support body has a hollow tube conformation, a hollow cuboid conformation or a hollow prism conformation. In a most preferred embodiment, the support body has a hollow tube conformation. The support body can be of any material and can be rigid or semi-rigid. In a preferred embodiment, the support body is made of glass, a plastic material, e.g. polystyrene, polypropylene, polycarbonate, polyethylene terephthalate or polyamide, polyvinyl chloride, or metal, e.g. aluminum, titanium or steel. In a further embodiment, the support body is bendable.

Typical for the present invention is that the first end (3) of the support body (2) is in fluid connection (e.g. through one or more openings) with the internal surface (the inside) of the swab tip (1) and that said support body (2) is configured to collect the sample via the sample tip (1) and to transport the sample from its first end (3) towards its second end (4). (FIGS. 1B-1C; FIGS. 2B-2C). As such, after passing through the filter material of the swab tip, the biological specimen to be collected is transferred from the internal surface of the swab tip into the first end of the support body, and further towards the second end of the support body. In one embodiment, the internal surface of the swab tip and the first end of the support body are thus in fluid connection with each other. Even further, the internal surface of the swab tip and both the first end and the second end of the support body are in fluid connection with each other. In a specific embodiment, the internal surface of the swab tip and the first end of the support body are in direct contact with and/or are attached to each other, thereby touching each other. In a preferred embodiment, the filter material of the swab tip and the support body are connected by heat-welding or ultrasonic welding. In another embodiment, the filter material of the swab tip and the support body are connected by a non-toxic glue which does not have a negative impact on the biological specimen. In still another embodiment, the filter material of the swab tip and the support body are connected with a sealing ring.

The sampling device according to the present invention is further typically characterized by the presence of a swab tip comprising a filter material with a pore size that decreases from the external surface of the swab tip to the internal surface of the swab tip (FIGS. 1B-1C; FIGS. 2B-2C). Due to the presence of this filter material the biological specimen can be selectively collected based on its size and the pore size of the filter material. In addition, the filter material also prevents unwanted substances e.g. impurities, particulates and large DNA structures, to be collected together with the biological specimen of interest, thereby increasing the purity of the biological specimen to be collected. This will facilitate the use of the purified samples in downstream molecular diagnostic pathways (e.g. real-time PCR, PCR, LAMP, sequencing, virus isolation, antigen or antibody ELISA). Finally, the filter material also prevents clogging of the sampling device.

The sampling device is typically suitable for the collection of biological specimens such as microorganisms (e.g. bacteria, yeasts, mold, fungi and parasites) and viruses, in particular viruses, bacteria and parasites, more in particular viruses. Commercial purification platforms for viruses for example are available but require extensive sample manipulation and laboratory equipment. They are also intended for virus concentration after large-scale production in cells. Such kits and platforms are costly and therefore not widely applicable for cheap and quick on-site preparation for veterinary and human diagnostic applications. With the present invention, a sampling device is provided that allows a hygienic, fast and pure collection of the biological specimen of interest.

The sampling device of the present invention is typically characterized in that it comprises a filter material with a pore size that decreases along the fluid flow direction, in particular from the external surface of the swab tip to the internal surface of the swab tip. In particular, said filter material has a pore size that still allows the passage of the biological specimen to be collected, but prevents the passage of other unwanted, and larger, substances or particles. As a result, the purity of the biological specimen to be collected is largely increased, resulting in representative samples instead of dirty mixtures of organic material. The sampling device thereby allows on-site purification of viruses, bacteria, parasites and other micro-organisms, without any negative effects on e.g. virus, bacteria or parasite infectivity. In a particular embodiment, the filter material is surfactant free.

Thus, in a further embodiment, the minimum pore size of the filter material is 5 μm. In a further embodiment the minimum pore size of the filter material is 10 μm. In still a further embodiment, the minimum pore size of the filter material is 20 μm.

A skilled person knows how to determine the pore size of a filter material. In the context of this invention, the pore size of a filter material can be determined using different technologies, for example electron microscopy, or by evaluating the passage of (fluorescent) microspheres of a pre-defined size through the filter material. In a preferred embodiment, the pore size of a particular filter material is determined by determining the passage of fluorescent microspheres of a pre-defined size using a flow cytometer or a fluorimeter.

In a further embodiment, the pore size of the sampling device can be adapted in function of the biological specimen to be collected. For example, if the sampling device is intended to collect only viruses, the pore size of the filter material will be different from the pore size of the filter material for a sampling device that also needs to collect bacteria.

Virus sizes range between 15 nm and 200 nm for those infecting mammalian host species. Non-mammalian viruses can have a bigger size of up to 700-800 nm for plant viruses and viruses infecting amoeba. Thus, in a specific embodiment, the pore size of the filter material of a sampling device to specifically collect viruses can be at least 1 µm, but maximum 2 µm.

Dimensions of bacteria representative for major bacterial phyla range between 700-2000 nm for Bacteroidetes, 250-2000 nm for Proteobacteria, 500-9000 nm for Firmicutes and 600-6000 nm for Actinobacteria. Thus, the pore size of the filter material of a sampling device to specifically collect bacteria is between 5 µm and 10 µm, in particular at least 10 µm.

Examples of parasites with human and veterinary clinical importance include *Eimeria* species such as *E. acervulina* (18×24 µm), *E. brunetti* (26×22 µm), *E. maxima* (30×20 µm), *E. necatrix* (20×17 µm) and *E. tenella* (23×19 µm) in chickens, *E. meleagridis* (24×18 µm) in turkeys, *E. bovis* (28×20 µm) and *E. zuerni* (18×16 µm) in cattle, *E. caprina* (34×23 µm) and *E. ninakohlyakimovae* (21×15 µm) in goats, *E. debliecki* (18×14 µm) and *E. polita* (26×18 µm) in pigs, *E. leuckarti* (55×38 µm) in horses and *E. stiedai* (35×20 µm) and *E. intestinalis* (26×18 µm) in rabbits. The infectious stages or cysts (8-12 µm) of *Giardia lambia/duodenalis* are released in feces and hold a zoonotic risk.

Examples of veterinary and medically important fungi are *Microspora canis, Trichophyton mentagrophytes, Candida albicans* and *Candida auris*. Fungal spores have a size of 2-4 µm and can be linked to each other in so-called hyphae. Yeasts are unicellular fungi and have a size of approximately 3-6.5 µm×2.5 µm for the veterinary important *Malassezia pachydermatis*.

In one embodiment, the filter material has a pore size ranging from about 5 µm to about 200 or 300 µm, or from about 10 µm to about 200 or 300 µm, or from about 10 to 150 µm, or from about 10 to 100 µm, or from about 20 to 200 µm or 300 µm, or about 20 to 150 µm, or from about 20 to 100 µm. In particular, the pore size in the filter material (being one layer or multiple layers) decreases in the sample flow direction or from the outer side to the inner side of the swab tip. In a specific example, the swab tip comprises (at least) two layers wherein the outer layer has a pore size of about 50 to 200 µm, of about 50 to 150 µm or of about 50 to 100 µm and the inner layer has a pore size of about 5 to 50 µm, of about 10 to 50 µm, of about 20 to 50 µm, of about 5 to 40 µm, of about 10 to 40 µm, or of about 20 to 40 µm.

The filter material of the present sampling device can be a single-layered filter material, such as for example seen in FIG. 1C or FIG. 2C. In a further embodiment, the single-layered material comprises a continuous pore size gradient that decreases from the external surface of the swab tip to the internal surface of the swab tip. In said instance, the pore sizes are gradually changed and decreased from the external surface to the internal surface of the one-layer filter material in the swab tip.

In another embodiment, a multi-layered filter material is present in the swab tip (FIG. 1B; FIG. 2B). In a further aspect, said multi-layered filter material comprises two or more layers wherein the pore size decreases from the external layer of the swab tip to the internal layer of the swab tip. In other words, each layer of said multi-layered filter material comprises a specific pore size wherein the pore size of each layer decreases from the external surface of the swab tip to the internal surface of the swab tip. In a further aspect, said multi-layered filter material comprises 2, 3, 4, or 5 layers. In a more preferred embodiment, the filter material is a multi-layered filter material comprising 2 or 3 layers.

The filter material of the present sampling device can be made of any material known in the art that allows the presence of pore sizes according to the different embodiments of the invention. In a preferred embodiment, the filter material is polyamide-based or nylon. Such nylon fabrics can be selected from, though not limited to fabrics with densities between 30 g and 500 g/m², in particular between 50 g and 300 g/m². The thickness of the nylon fabrics can range between 0.10 and 0.80 mm, in particular between 0.20 and 0.60 mm. Examples of such nylon fabrics include polyamide fabrics with densities of 190 g/m² or 270 g/m² and a thickness of 0.48 or 0.56 mm.

In a further embodiment, the sampling device according to the present invention further comprises means for creating a pressure gradient through the sampling device, in particular means for creating a negative pressure gradient. Typically, a negative pressure gradient is created that facilitates the transport of the sample from the sample tip (1) towards the second end (4) of the support body via the first end (2) of the support body. Such means for creating a pressure gradient, vacuum or suction can be a standard syringe (or syringe plunger) device. Though, other devices or systems capable of achieving a pressure gradient may also be used, including, but not limited to, standard suction devices, bulge, plumber, air pumping apparatuses, vacuum devices, etc. In another embodiment, the means for creating a pressure gradient forms the collection tube. In still another embodiment, the means for creating a pressure gradient forms the support body of the sampling device.

Optionally, the swab tip of the present sampling device may comprise an additional (fabric) layer on its external surface (the outside layer). In particular, said additional layer is positioned on the external surface of the filter material of the swab tip. This layer is typically comprised of a loose layer or material that has scraping or brushing characteristics or capacity to grasp sampling material. This layer has a non-smooth surface, which can also be achieved by means of flocking (e.g. using short fibers that are arranged in a perpendicular fashion). Thus, in a particular embodiment, the additional layer on the external surface of the swab tip comprises a plurality of short fibers that are arranged by flocking. In another particular embodiment, the fabric layer comprises pores with a pore size of at least 100 µm, and typically ranges from 100 µm to 500 µm. Non-limiting examples of suitable fabrics for said additional layer are natural or synthetic polyamides and cotton. In a specific example, the swab tip comprises three layers wherein the fabric layer has a pore size of about 100 to 300 µm, the outer layer of the filter material has a pore size of about 50 to 100 µm and the inner layer of the filter material has a pore size of about 10 to 50 µm. In another specific example, the swab tip comprises three layers wherein the fabric layer has a pore size of 200 to 500 µm, the outer layer of the filter material layer has a pore size of 50 to 200 µm, and the inner layer of the filter material has a pore size of 10 to 40 µm.

The presence of said fabric layer allows the collection of as much as organic material as possible. The fabric layer can be used as the scraping surface to collect the specimen at a particular location.

As already outlined above, collection of the biological specimen with the sampling device of the present invention can be done by scraping with the swab tip into a sample of interest or onto a location of interest (e.g. FIGS. 3A-3B). In another aspect, collection of the biological specimen can be done by immersion of or bringing the swab tip into a fluid sample (e.g. FIGS. 3C-3F). In both instances, the swab tip ensures that the biological specimen of interest is collected during scraping at the site of collection, or that the biological specimen is collected in the device after immersion of the swab tip into a fluid sample in order to release and/or dissolve the biological specimen into said fluid sample, in particular for non-fluid biological specimen such as mucus or faeces, or when cell lysis is required (e.g. lysis of blood cells). This is especially the case when the consistency of the biological specimen is too high, when cells need to be lysed to release intracellular pathogens, or when the amount of the biological specimen is too low, so that it does not allow aspiration through the tip of the sampling device and subsequent recovery at the second end of the support body when a pressure is applied.

Samples that may be tested include clinical and non-clinical samples in which further in vitro cell growth is or may be suspected, as well as samples occasionally tested for the presence of microorganisms or viruses. Typically, samples can be tested directly with little or no extensive pretreatment.

Locations in or on a subject where the swab tip can be used to collect a biological specimen can be any locations in or on a subject. Said locations can be the skin, the airways, the esophagus, the anus, the vagina, the stomach, the mouth, the tongue, nose, ear or any other location that can be reached using the sampling device. The sample that can be collected during scraping can be sweat, lung aspirate, vaginal fluid, gastric fluid, faeces, urine, etc.

In another aspect, the sampling device can be immersed in a fluid sample, such as for example a bodily fluid sample (including secretions/excretions). The bodily fluid sample can be selected from blood, respiratory mucus, lung aspirate, vaginal fluid, gastric fluid, saliva, urine, faeces, or cerebrospinal fluid. In another aspect, the sample from which the biological specimen is to be collected and isolated is selected from solid tumors, warts, sarcoids or fibromas. In said instance, the surface of the sample is swept with the swab tip of the sampling device in order to collect the biological specimen. In order to collect the biological specimen from the sample, the sample tip can be pre-wetted with a rinsing buffer. In another aspect, after scraping with the swab tip, the sampling device can be connected to a collection tube wherein the collection tube us in fluid connection with the second end of the support body and wherein the collection tube is filled with a fluid. Releasing of said fluid via a positive pressure gradient in to a collection container results in a fluid solution comprising the biological specimen. The biological specimen can then be re-collected from the collection container via the swab tip into the support body and the collection tube by using a negative pressure gradient.

In some embodiments, the sampling device of the present invention allows the collection of a biological specimen from a subject. This subject can be a living subject or a dead subject. The subject can be a healthy subject or an ill subject. The subject can be a human or a non-human animal; preferably a human, a non-human mammal, or a non-mammal. Non-human mammals are selected from non-human primates, rodents (e.g. mouse or rats), canines, felines, equines, bovine, camelids, ovines, porcines. Non-mammals are selected from birds, chicken, bats, fish, mussels, shrimps, prawns, crustaceans, amphibians, reptiles, etc.

In one embodiment, the swab tip is designed so that it is applicable in small orifices in order to take the sample (e.g. animal nose). The tip diameter can range from about 0.5 cm to about 2 cm, from about 1 cm to about 1.5 cm. The swab tip of the sampling device can further be of any shape or design (e.g. cylindrical, ellipsoid, spherical, etc.). In a preferred embodiment, the swab tip has a cylindrical tube conformation. In another embodiment, the swab tip has a spherical conformation. In yet another embodiment, the swab tip has an ellipsoid conformation.

Yet, in another aspect, the sampling device of the present invention can also be used for the collection of biological specimens at another location than a subject or from another fluid sample than a bodily fluid sample. Thus, in a particular embodiment the sampling device can be used for the collection of a water sample via scraping at a particular location, e.g. at the bottom of a pond, a puddle, a lake, a river, or a sea, or via immersion of the sampling device into said water sample. Said water sample is selected from fresh water, brackish water, waste water, etc.

Other non-clinical samples include foodstuffs, beverages, pharmaceuticals, cosmetics, air, soil, sewage, plant material, etc.

As already discussed above, the sampling device of the present invention is particularly useful for the collection of a biological specimen without the risk of any other larger unwanted particles to be present in the collected sample. The use of a filter material according to the different embodiments as described herein, ensures that any unwanted and larger particles are prevented to be collected. The filter material also prevents clogging of the device with said larger particles. In a further embodiment, clogging of the sampling device is further prevented by the presence of one or more (e.g. 2, 3, 4, 5, 6, 7, 8, 9, 10, 11, 12, 13, 14, 15; or more; in particular about and between 1 to 10; preferably between 1 and 8) openings, apertures, grooves or gaps in the side walls of the first end of the support body (e.g. FIGS. 2B-2C). Said openings will ensure an equal absorption of the sample. Therefore, in an embodiment of the present invention, the sampling device comprises a swab tip according to any of the possible embodiments and a support body, wherein the support body has a hollow conformation with a first end and a second end, wherein said first end comprises one or more openings in the side walls, and wherein the first end is in fluid connection with the internal surface of the swab tip. When the one or more openings are present in its side walls, the first end of the support body can end either in a closed tip or in an open tip. Due to the presence of said one or more openings, clogging of the swab tip is prevented and a more equal transfer of the biological specimen into the support body is achieved. The one or more openings in the side wall of the first end of the support body can be of any shape (round, ellipsoid, square, rectangular, etc.).

Figure 4A:
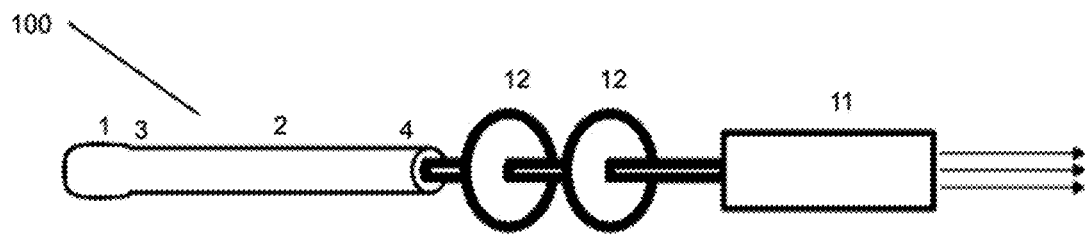
FIGS. 4A, 4B: Sampling device according to an embodiment of the invention. In this embodiment the sampling device (100) comprises a swab tip (1), a support body (2), one or more filters (12) and a collection device (11).
Figure 4B:
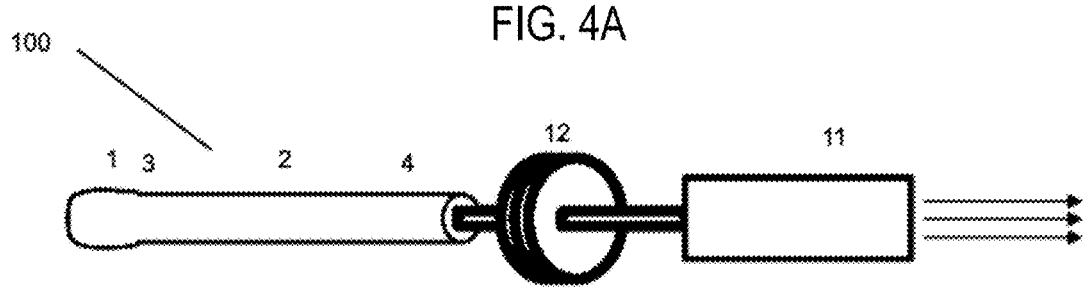

As already discussed, the present invention relates to a sampling device for the collection and isolation of a biological specimen. Therefore, in a further embodiment, the sampling device comprises a collection tube that is in fluid connection with the second end of the support body, and wherein the support body is configured to collect the sample via the sample tip and to transport the sample from its first end towards its second end. In an even further embodiment, one or more filters are integrated in either one or positioned in between the support body and the collection tube (FIGS. 4A-4B). Said filters can be any filters known to the skilled person (e.g a nylon, cellulose acetate, polyether sulphone, nitrocellulose, glass fibers, polypropylene, polytetrafluoroethylene, or polyvinyldifluoride filter) and suitable for the present application. In a particular embodiment, said filters are nylon or cellulose acetate (syringe) filters with a pore size of about 0.1 µm to about 6.5 µm, in particular with a pore size of 0.1 µm, 0.22 µm, 0.45 µm, 0.8 µm, 1.2 µm, 5 µm, 6 µm or 6.5 µm, and even more preferred with a pore size of about 0.8 µm or about 5 µm.

Hence in one embodiment, the sampling device comprises a swab tip, a collection tube and one or more filters having a pore size of about and between 4 µm and 6.5 µm, such as e.g. 4.0 µm, 4.5 µm, 5.0 µm, 5.5 µm and 6 µm; and/or one or more filters having a pore size of about and between 0.1 µm and 1.5 µm, such as e.g. 0.1 µm, 0.22 µm, 0.45 µm, 0.8 µm and 1.2 µm. In particular, the filter is a cellulose acetate filter, more in particular free of surfactant.

Figure 5A:
FIGS. 5A, 5B, 5C, 5D, 5E: Schematic overview of different sampling devices and/or parts thereof.
Figure 5B:
Figure 5C:
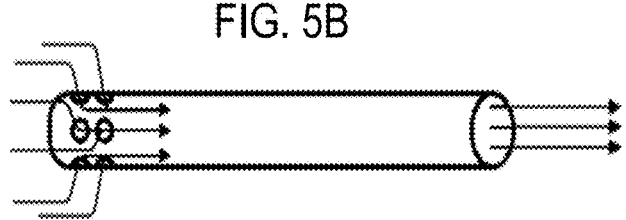
Figure 5D:
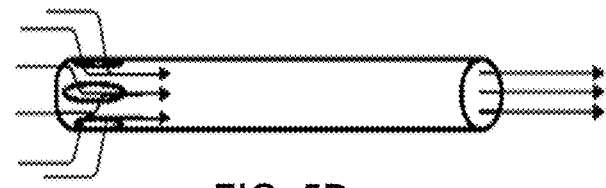
Figure 5E:
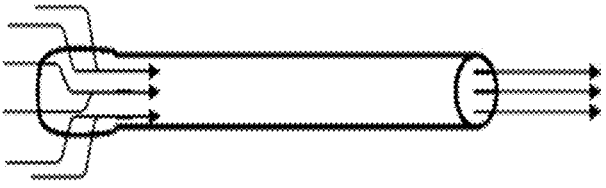

FIGS. 5A-5E disclose different types of sampling devices, of which only FIG. 5E is a sampling device according to an embodiment of the present invention. FIG. 5A represents a sampling device which is only a hollow tube, without the presence of any filter material. FIG. 5B represents a closed tube which does not allow any collection of a biological specimen. FIGS. 5C and 5D disclose a sampling device without a swab tip comprising filter material. In those sampling devices several openings are present in the side walls of the first end of the support body allowing collection of a biological specimen. FIG. 5E discloses a sampling device similar to the device in FIG. 5C or FIG. 5D but including a swab tip comprising a filter material. In FIG. 5E, the one or more openings in the side walls of the first end of the support body are covered by the swab tip.

The present invention also provides a kit of parts for assembling the sampling device as provided herein. In one embodiment said kit of parts includes a support body comprising a swab tip as provided herein, one or more filters, a collection tube and optionally a means for providing a fluid flow or pressure gradient in the device and optionally a container with collection fluid.

The present invention also includes a method for the collection and/or isolation of a biological specimen from a sample or from a location. Said method comprises the following steps:
- scraping with and/or immersing or bringing the external surface of the swab tip of the sampling device according to the present invention in the sample or at a location;
- collection of a biological specimen from the sample or the location in the external surface of said swab tip;
- optionally bringing the swab tip and the collected biological specimen in a liquid medium;
- transfer of the biological specimen through the swab tip (such as from the external surface of the swab tip to the internal surface of the swab tip) and further into the support body of said sampling device; and
- collection of the biological specimen from the support body of said sampling device into a collection tube, wherein the collection and/or isolation of the biological specimen is performed using a pressure gradient.

The pressure gradient can be generated by any means for creating a pressure gradient. Such means can be a standard syringe device. Though, other (automatic or manual) devices capable of achieving a pressure gradient may also be used, including, but not limited to, standard suction device, air pumping apparatuses, vacuum devices, etc. Optionally, after passage through the swab tip and/or support body a size purification step is performed by transferring the biological specimen through one, two or more (uncharged) filters. In case of two or more filters these are positioned as such to create a gradient of decreasing pore sizes in the direction of the sample flow.

In still another embodiment, the present invention provides a method for the collection and isolation of a biological specimen from a sample or from a location, said method comprising the following steps:
- scraping with and/or immersing the external surface of the swab tip (1) of the sampling device (100) according to the present invention in the sample or at a location thereby collecting a biological specimen in the swab tip;
- connecting the support body (2) of the sampling device to a collection tube (11) wherein the collection tube is in fluid connection with the second end of the support body (2) and optionally one or more filters that are positioned in between the support body (2) and the collection tube (11) and wherein the collection tube is filled with a fluid;
- releasing the fluid from the collection tube via the one or more filters, the support body (2) and the swab tip into a collection container by using a positive pressure gradient;
- re-collecting the biological specimen and the fluid from the collection container via the swab tip into the support body and the collection tube by using a negative pressure gradient.

In a further aspect of said method, the pressure gradient can be generated by any means that is able to create a positive and a negative pressure gradient. Such means can be a standard syringe device. Though, other devices capable of achieving a pressure gradient may also be used, including, but not limited to, standard suction device, air pumping apparatuses, vacuum devices, etc. In another embodiment, said means for creating a pressure gradient function as a collection tube (11).

In a further aspect of said method, the fluid present in the collection tube is any fluid that ensures a good solubility of the biological specimen. In a particular embodiment, said fluid is selected from saline, water, a buffered solution, pathogen transport medium or any other standard rinsing buffer.

In a further embodiment, the method of the present invention comprises an additional step wherein an additional fluid or liquid is added to the sample before scraping with and/or immersing the external surface of the swab tip in the sample or at a location. For example, when biological specimens are collected from a faeces sample, additional fluid can be added to the faeces sample to increase the fluidity of the sample. Also when biological specimens are collected for example from a tumor sample, additional fluid can be added to optimize the collection of the biological specimen. Besides physiological fluids, any other liquid samples may be used, such as water, or transport buffers, cell culture medium, storage buffers, or any other products.

In another embodiment of the disclosed method, the biological specimen is collected in a collection tube that is in fluid connection with the second end of the support body. In an even further embodiment, an additional treatment step can be applied on the collected biological specimen sample in said collection tube. This additional treatment step can be used to improve the quality or purity of the biological specimen. Said treatment step involve infiltration, precipitation, dilution, distillation, mixing, concentration, inactivating of interfering components, or the addition of extra reagents. Besides physiological fluids, any other liquid samples may be used, such as water, or other products and the like for the performance of any downstream assays. In a further embodiment, the method comprises the step of identifying and/or characterizing the biological specimen(s) present in the sample.

The present invention is illustrated by the following Examples, which should not be understood to limit the scope of the invention to the specific embodiments therein.

EXAMPLES

1. Assessment of the Pore Sizes of the Polyamide Fabrics Present in the Sampling Device The pore sizes of the different layers of polyamide fabrics that can be used as filter material in the sampling device of the present invention were defined using fluorescently-labeled microspheres of different sizes.

Materials

Microspheres used in the experiment hereafter are shown in Table 1.

The 1 µm, 10 µm and 40 µm microspheres were analyzed using a Cytoflex flow cytometer (Beckmann Coulter). The 80 µm were not analyzed using the Cytoflex flow cytometer to avoid clogging of the nozzle (100 µm diameter). A fluorimeter was used to assess the fluorescence of 80 µm microspheres. All microspheres were handled using wide bore tips.

Fluorescent microspheres were vortexed during 15 sec, protected from light and stored on ice in between handling. The 1 µm and 10 µm microspheres were ready-to-use suspensions. The 40 µm and 80 µm microspheres were dry particles and were resuspended in 5 ml of Dulbecco's Phosphate Buffered Saline (ThermoFischer), followed by vortexing before use. Next, dilutions of the microspheres were made in Dulbecco's Phosphate Buffered Saline (ThermoFischer) resulting in a total volume of 20 ml for use in the experiments. These suspensions were transferred to different 15 ml collection tubes (2 ml suspension for each tube).

Next, each suspension was aspirated using the following conditions and collected in a syringe:

A. Sampling device (100) as presented in FIG. 2B, (100), comprising a support body with a hollow conformation and several openings in the side walls, and a swab tip with a filter material with two layers (inner layer with a density of 270 g/m$^2$ and outer layer with a density of 190 g/m$^2$) and an additional fabric layer on the external side of the swab tip (80 g/m$^2$);

B. A sampling device comprising a support body with a hollow conformation and several openings in the side walls, and a swab tip with a filter material with only one layer (layer 1: polyamide fabric with a density of 270 g/m$^2$, shown e.g. in FIG. 2B (5));

C. A sampling device comprising a support body with a hollow conformation and several openings in the side walls, and a swab tip with a filter material with only one layer (layer 2: polyamide fabric with a density of 190 g/m$^2$, shown e.g. in FIG. 2B (6));

D. A sampling device comprising a support body with a hollow conformation and several openings in the side walls, and a swab tip with only one fabric layer on the external side of the swab tip (layer 3; polyamide fabric with a density of 80 g/m$^2$, FIG. 2B (7));

E. Support body with openings in the side wall without the presence of a swab tip or external fabric layer (FIG. 5C, 10) (positive control);

F. Sampling device as presented in FIG. 2B, (100), comprising a support body with a hollow conformation and a swab tip with a filter material with two layers (inner layer with a density of 270 g/m$^2$ and outer layer with a density of 190 g/m$^2$) and an additional fabric layer on the external side of the swab tip (80 g/m$^2$) and said sampling device connected to a 5 µm and 0.8 µm surfactant free cellulose acetate (SFCA) filter respectively (FIG. 4A);

G. 18 G Needle connected to a 5 µm SFCA filter;

H. 18 G Needle connected to a 0.8 µm SFCA filter.

The syringe content was transferred to a non-autoclaved 1.5 ml collection tube, stored on ice and protected from light using aluminum foil. Non-autoclaved tubes were used to avoid retention of microspheres in cracks in the polystyrene. Samples containing the 1 µm, 10 µm or 40 µm microspheres were loaded in V-bottom 96-well plates. Samples containing the 80 µm microspheres were loaded in black-walled 96-well microplates for fluorescence-based assays.

Analysis of the 1 µm, 10 µm and 40 µm fluorescent microspheres was conducted on a Cytoflex flow cytometer using the Cytexpert software. At the start, the machine was flushed and quality control using QC beads was conducted on a daily basis. The forward scatter and fluorescence signal were used to characterize the particles. A 488 nm (blue) laser was used to excite the green fluorescent microspheres and

TABLE 1

Overview of microspheres and their properties

| Size (diameter) | 1 µm | 10 µm | 40 µm | 80 µm |
|---|---|---|---|---|
| Manufacturer & cat no | ThermoFischer G0100 | ThermoFischer CDG1000 | ThermoFischer 35-7 | ThermoFischer 35-10 |
| Name | Fluoro-Max Dyed Green Aqueous Fluorescent Particles | Fluoro-Max Dyed Green Aqueous Fluorescent Particles | Fluoro-Max Green Dry Fluorescent Particles | Fluoro-Max Green Dry Fluorescent Particles |
| Volume/mass | 10 ml (in water) | 10 ml (in water) | 1 g, 1 ea | 1 g, 1 ea. |
| Composition | Polystyrene | Polystyrene | Polystyrene Divinylbenzene | Polystyrene Divinylbenzene |
| Color | Green | Green | Green | Green |
| Dye type | Firefli ™ Fluorescent Green (468/508 nm) | Firefli ™ Fluorescent Green (468/508 nm) | Firefli ™ Fluorescent Green (468/508 nm) | Firefli ™ Fluorescent Green (468/508 nm) |
| Density | 1.05 g/cm$^3$ | 1.05 g/cm$^3$ | na | na |
| Concentration | 1% solids | 1% solids | $2.83 \times 10^{7}$/gram | $3.54 \times 10^{6}$/gram |
| Particles/ml | $1.81 \times 10^{10}$/ml | $1.81 \times 10^{7}$/ml | na | na | detection was done in the fluorescent channel 525/40 BP. Particle counting was done during 35 sec at a flow of 30 µl per minute. For the 1 µm, 10 µm and 40 µm microspheres, thresholds were set at 60,277, 278,468 and 300,000, respectively. Flushing was conducted after each measurement to exclude carry-over between samples. The number of singlets was counted by the flow cytometer. The experiment and measurements were replicated to generate a total of 3 independent measurements.

The 80 µm microspheres were analyzed using a fluorimeter with excitation at 485 nm and detection of emission at 527 nm. A serial 1/2 dilution series of the microspheres was enclosed to allow quantification of the unknown samples against a standard curve (range between 35481 and 139 microspheres/ml). A standard curve was enclosed in each repetition. Two duplicates were enclosed for each dilution point of the standard curve and each unknown sample. The experiment was independently repeated three times. Linear regression was used to interpolate the unknowns from the standard curve.

Differences between the different conditions tested were compared using ANOVA and a Holm-Sidak post-test to compare all conditions tested against the sample collected using the support body (E). P-values were adjusted to account for multiple comparisons.

Results

Figure 6:
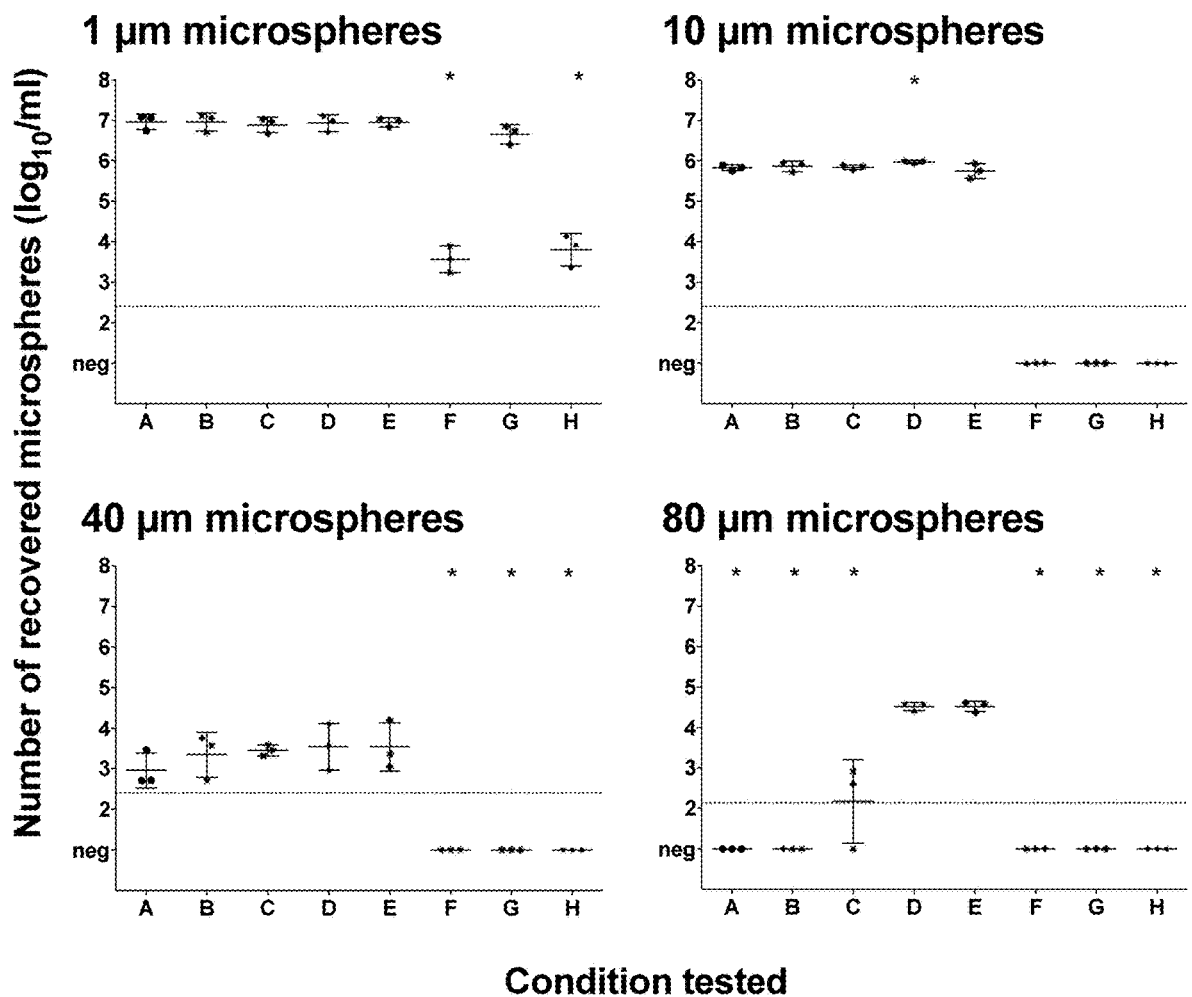
FIG. 6: Recovery of 1 µm, 10 µm, 40 µm and 80 µm microspheres from a suspension aspirated through the sampling device (A) comprising a swab tip with a fabric layer and a filter material of 2 layers, (B) the swab tip comprising only the inner fabric layer of the filter material, (C) the swab tip comprising only the outer fabric layer of the filter material, (D) the swab tip only comprising the external fabric layer, (E) the support body), (F) the sampling device comprising a swab tip with a fabric layer and a filter material of 2 layers and in connection to 5 µm and 0.8 µm SFCA filters, (G) only passage through a 5 µm SFCA filter (G) and (H) only passage through a 0.8 µm SFCA filter (H). Measurements of 3 individual experiments are shown by dots. Mean and standard deviations are shown by bars and flags. *$p<0.05$: between the condition tested and the support body (E).

The results of the experiments with the 1 µm, 10 µm, 40 µm and 80 µm microspheres are shown in FIG. 6. Compared to the number of beads recovered through the support body without a swab tip, which serves as positive control (E), no reduction of 1 and 10 µm microspheres can be observed when aspiration is done through the sampling device or the individual layers (1, 2 and 3) of the swab tip (A, B, C, D). In contrast, the number of 1 µm microspheres is reduced with a factor of approximately 3.4 log 10 when the sampling device comprising 3 layers of fabric is connected to the aforementioned 5 µm and 0.8 µm SFCA filters (F) ($p<0.0001$, mean±SD 6.96±0.11 vs 3.56±0.33 $\log_{10}$ microspheres/ml), an effect mainly caused by the 0.8 µm filter ($p<0.0001$, 3.80±0.40). This is an advantage for the use of the sampler e.g. in a viral metagenomics pipeline as host cells, bacteria or other pathogens with a similar or larger size are heavily reduced and sequencing of background DNA is avoided.

The sampling device or its different layers of fabrics did not have a negative impact on the 10 µm microspheres ($p>0.05$) (A, B, C, D). No microspheres were observed after passage through the sampling device comprising 3 layers of fabric in connection to the aforementioned 5 µm and 0.8 µm SFCA filters (F) ($p<0.0001$), the 5 µm SFCA filter (G) ($p<0.0001$) and the 0.8 µm filter (H) ($p<0.0001$).

The sampling device and the different layers of the swab tip had no significant impact on the 40 µm microspheres in comparison to the support tube without swab tip ($p>0.05$). Logically, the 40 µm microspheres were not detected after collection with the sampling device in connection the aforementioned 5 µm and 0.8 µm SFCA filters (F) ($p<0.0001$), the 5 µm filter (G) ($p<0.0001$) or the 0.8 µm filter (H) ($p<0.0001$).

Finally, the 80 µm microspheres were not detected after passage through the sampling device (A) or the most dense first layer of the swab tip (B) and thus significantly different from the number of microspheres detected after collection with the support body without swab tip (E) ($p<0.0001$). An approximate 225-fold reduction of microspheres was seen after passage through the second layer of fabrics (C) ($p<0.0001$) in comparison to collection with the support body (4.53±0.10 vs 2.17±1.03). Logically, also the 80 µm microspheres were not detected after collection with the sampling device in connection the aforementioned 5 µm and 0.8 µm SFCA filters (F) ($p<0.0001$), the 5 µm filter (G) ($p<0.0001$) or the 0.8 µm filter (H) ($p<0.0001$).

2. Use of a Sampler for Aspiration of Turbid Suspensions

2A. Aspiration of Fecal Suspensions with a Classical Cotton Swab (Prior Art)

The ability of a classical cotton swab to aspirate fecal suspensions was tested first. A cotton swab with a plastic rayon, composed of a first end (cotton tip), support body and second end were cut at the second end. An 18 Gauge needle was inserted in the second end and connected to a 5 ml syringe with a rubber plunger (Terumo). The swab tip was immersed in a container with feces from pigs and then transferred into 1 to 5 ml of phosphate buffered saline. The suspension was shaken for 10 seconds and the suspension was aspirated using a pressure exerted by the syringe.

High resistance was experienced when exerting a pressure on the syringe to aspirate the fecal suspensions from all samples and this would be a large practical disadvantage during rapid on-site processing of samples in the field. The aspirated volumes are shown in Table 2:

| Feces resuspended in volume of PBS (ml) | Aspirated volume |
|---|---|
| 5 | 1.4 ml |
| 3 | 1.6 ml |
| 2 | 1.5 ml |
| 1 | 0.9 ml |

2B. Filtering Capacities of Polyamide Fabrics

In this experiment we compared the filtration capacities of different polyamide fabrics by aspiration of fecal suspensions. The aim was to select a filter material and fabric with a filtering capacity, while not having to exert high pressures during aspiration.

Methods

Two polyamide fabrics with a weight of 115 g/m$^2$ or 270 g/m$^2$ were selected and compared against each other.

The 115 g/m$^2$ and 270 g/m$^2$ fabrics were each covered with a less dense, loose outer layer (density of 80 g/m$^2$) to capture the sample specimen. These polyamide fabrics were in fluid connection with the support body, containing eight openings in the side walls at its first end. Feces was collected with both sampling devices and directly transferred to collection tubes filled with 4 ml of transport medium. Next, the swab tip was scraped against the collection tube's wall to homogenize the fecal suspension and aspirated using a syringe. Different criteria were used to determine the filtration capacity: aspirated volume, manual power needed to aspirate the fecal suspension and the clarity of the filtrate was judged subjectively (eye) and objectively (spectrophotometry). Light absorbance of the suspensions was measured using a spectrophotometer and the transport medium was used as blanco.

Results

The results of the comparison between both fabrics are shown in Table 3:

| Criteria | Fabric 115 g/m² + 80 g/m² | Fabric 270 g/m² + 80 g/m² |
|---|---|---|
| Aspirated volume | 3 ml | 1.5 ml |
| Aspiration force | Low | Low |
| Subjective clarity | turbid | relatively clear |
| Objective clarity (absorbance) | >2.0 A | 1.93 A |

The largest aspirated volume of fecal suspension was retained using the fabric with the lowest density (115 g/m²). However, this fabric demonstrated poor filtration capacities and resulted in a turbid suspension when compared to the 270 g/m² fabric. Absorbance was measured with a spectrophotometer but the sample obtained with the 115 g/m² fabrics was outside the measuring capacities of the device, confirming the high turbidity. In contrast, absorbance of the suspension generated with the 270 g/m² layer was much lower at A1.93 and indicative for a stronger filtering effect with only a limited amount of power needed for aspiration. This ease of use would also be an advantage if different filters with smaller pore sizes (5 μm and 0.8 μm) need to be connected to the sampling device for further filtration.

However, when this sampling device covered with the fabrics of 270 g/m² and 80 g/m² was connected to a 0.8 μm surfactant-free cellulose acetate filter, it was relatively difficult to aspirate the fecal suspension due to rapid clogging of the SFCA filter and only 0.5 ml of clear fluid could be collected.

Therefore, it was decided that an intermediate additional layer of 190 g/m² in the swab tip would be beneficial to function as an additional sieve. The swab tip of the sampling device composed of subsequent layers of 270 g/m², 190 g/m² and 80 g/m² proved a good combination and led to the recovery of 2.8 ml of fecal suspension. This sampling device of which the swab tip is composed of three layers of polyamide fabrics was subsequently used in the experiments described hereafter.

3. Influence of Sampler on Virus Infectivity of Pure Viruses Grown in Cell Culture The aim of the experiment was to demonstrate the absence of negative effects of the sampling device (comprising a swab tip composed of three layers of fabrics), the sampling device in connection to 5 μm and 0.8 μm surfactant-free cellulose acetate filters, or the 5 μm and 0.8 μm cellulose filters individually. The infectivity of different viruses with a broad range of characteristics (genome composition, size, structure, resistance . . . ) was evaluated by applying the above-mentioned conditions. Retaining viral infectivity is important for diagnostics and allows the possibility to isolate the virus in cell cultures. This is beneficial for developing new vaccine candidates for human and veterinary applications, or for autovaccine production in veterinary medicine. Having the ability to filter out impurities and bacteria will also lead to more pure viral samples, reducing the background and chances for false-positive signaling in downstream analyses and reducing the ability of unwanted microbiological contamination upon inoculation in susceptible cells.

The viruses were grown in cell cultures and spiked in phosphate buffered saline.

Methods

Six porcine viruses with different virus characteristics were grown in their respective host cells to prepare virus stocks, which were stored at −70° C. until use. All viruses were tested in separate experiments.

1° porcine influenza virus
strain Sw/Ghent/28/10/H1N1 (Qiu et al., 2015, Veterinary Research)
negative, segmented single-stranded RNA genome (13.5 kb)
80-120 nm size,
enveloped
host cell line: Madin-Darby Canine Kidney (MDCK) cells 2° porcine respiratory and reproductive syndrome virus (PRRSV)
strain 13V091 (Frydas et al., 2015, Veterinary Research)
positive, non-segmented single-stranded RNA (15 kb),
45-65 nm size
enveloped
host cell line: Marc cells 3° equine herpesvirus 1
strain 03P37 (Garré et al., 2007, Veterinary Microbiology)
non-segmented double-stranded DNA (150 kb)
150-200 nm size
enveloped
host cell line: RK-13 cells 4° porcine circovirus 2 (PCV2)
strain Stoon 10/10 (Ellis et al., 1998, Can Vet J)
positive, circular single-stranded DNA (1.7 kb)
17 nm size
non-enveloped
host cell line: porcine kidney (PK)-15 cells 5° rotavirus A
strain RVA/Pig-tc/BEL/12R046/2012/G9P (Theuns et al., 2015, Journal of Virology)
segmented, double-stranded RNA (18.5 kb)
80-100 nm size
non-enveloped
host cell line: MA104 cells 6° porcine adenovirus
strain 13V091 (unpublished results, isolated at Laboratory of Virology)
non-segmented dsDNA (35 kb)
90 nm size
non-enveloped
host cell line: swine kidney (SK) cells Virus stocks were thawed and centrifuged at 13,000 rpm for 3 min at room temperature. A 1/50 v/v dilution of each virus stock was prepared in phosphate buffered saline (PBS) containing $Ca^{2+}$ and $Mg^{2+}$ except for equine herpes virus, which was diluted 1/200 (v/v) because of the high stock titer.

The virus suspensions were aspirated through the following components:

- the sampling device comprising a swab tip with three layers (270 g/m², 190 g/m² and 80 g/m²) of fabrics (Nylon swab),
- a 5 μm surfactant-free cellulose acetate (SFCA) filter (Sartorius) (5.0 μm SFCA),
- a 0.80 μm SFCA filter (Sartorius) (0.80 μm SFCA) and
- the sampling device comprising a swab tip with three layers (270 g/m², 190 g/m² and 80 g/m²) of fabrics in connection to a 5 μm and 0.8 μm SFCA filter (Sampler).

The virus dilution that was made served as positive control, whereas PBS served as negative control to exclude cross-contamination. All samples were stored on ice between the handling steps. For each viral species, the experiment was executed at least three times and the infectious virus titers were immediately assessed by infectivity titration in the respective host cells. Serial 10-fold dilutions of the samples were inoculated for 1 h at 37° C. and 5% $CO_2$ for most viruses except influenza virus, which was inoculated for 2 h. Next 100 µl cell culture medium was added before incubation of the cells during 4 to 10 days, depending on the viral species. As described in literature, trypsin was enclosed in the inoculation and cell culture medium of rotavirus and influenza virus, to enhance infection. Cytopathogenic effects were evaluated using a light microscope and infectious virus titers were determined using the formula of Reed and Muench.

A non-parametric Kruskal-Wallis test was conducted in GraphPad Prism (version 6) to assess differences between conditions tested. A p-value of <0.05 was considered to be significant. A Dunn's post-test was done to perform multiple comparisons and to assess which conditions were significantly different.

Results

Figure 7:
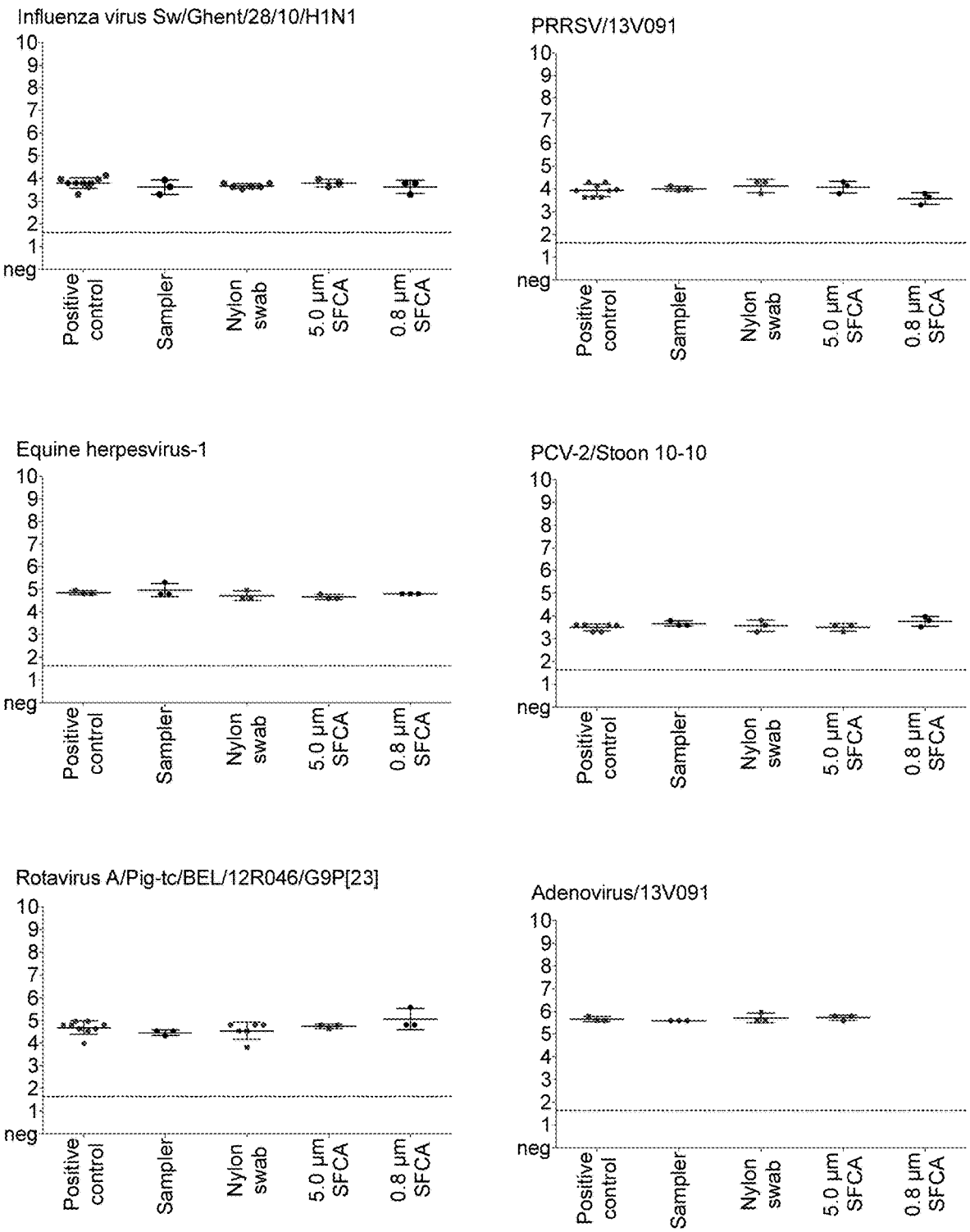
FIG. 7: Infectious titers for different viral species upon passage through the sampling device and different components of the sampling device. Mean±standard deviation of infectious virus titers ($CCID_{50}$/ml) of at least 3 independent experiments are shown for each virus. The dotted line represents the limit of detection of the titration assay. The 0.8 µm SFCA filter was not tested with adenovirus and thus no values are shown.

The results of the infectivity titration upon passage of the virus suspensions through the different sampler's components are shown in FIG. 7. No significant differences between the conditions tested and the positive control were observed for PCV2 (p=0.4444), PRRSV (p=0.1863), rotavirus (p=0.1130), adenovirus (p=0.8364), influenza virus (p=0.4409) and equine herpesvirus 1 (p=0.2591). Possible effects of the 0.8 µm SFCA filter on the porcine adenovirus were not tested separately, but can be excluded as the complete sampler did not induce negative impact on virus infectivity. It can be concluded that the sampling device according to the present invention does not exert any negative effects on the infectivity of different types of viruses.

4. Influence of Sampler on Free-Floating High Molecular Weight DNA from Bacterial Origin.

The aim of the experiment was to demonstrate the ability of the sampling device to capture large DNA strands. This would be beneficial for downstream molecular assays such as PCR, real-time PCR, digital PCR, LAMP and sequencing, as it reduces the chance of background DNA amplification or detection by any form of PCR or sequencing. Large strands of DNA are also difficult to digest using nucleases.

Methods

A bacterial suspension of Escherichia coli DH10B was grown overnight in LB medium for 18 h at 37° C. on a shaker. Bacterial cells were centrifuged at 4,000 rpm for 10 min at 4° C. and resuspended in a buffer (50 mM Tris-Cl (pH 8.0) and 10 mM EDTA) to which SDS and proteinase K was added for lysis at 50° C. during 1 h. Next, an equal amount of Phenol:Chloroform:Isoamylalcohol was added and mixed by flicking until a white emulsion was formed. The emulsion was centrifuged at 13,000 rpm for 15 min at 4° C. to separate the aqueous phase from the liquid fraction while generating a protein-rich. The upper aqueous phase was collected without disturbing the protein-rich interphase. Again, an equal amount of Phenol:Chloroform:Isoamylalcohol was added and the process was repeated to improve the purity. Finally, the DNA was precipitated from the aqueous phase using absolute ethanol containing 0.03M NaCl and centrifugation at 13,000 rpm for 30 min at 4° C. The supernatant was carefully collected and discarded. A washing step was conducted with 70% ethanol by centrifugation for 5 min at 13,000 rpm and 4° C. Next, the pellet was dried at 50° C. and resuspend in Tris-EDTA buffer (10 mM Tris (pH 8.0), 1 mM EDTA). The DNA was stored at 4° C. and presence of large DNA structures was demonstrated by agarose gel electrophoresis.

Next, the purified DNA was diluted in nuclease-free water and aspirated with:
1) a needle connected to a syringe,
2) the sampling device with a swab tip comprising three layers of fabrics of the present invention, or
3) the sampling device connected to the aforementioned 5 µm and 0.8 µm SFCA filters.

Water was used as a control and underwent the same handlings. Next, the resulting supernatants were loaded on a 1% agarose gel. Smartladder (Eurogentec, 10 kb (upper band) to 200 bp (lower band)) was loaded to assess sizes of the purified E. coli DNA. The agarose gel was run for 30 min at 100 mv and nucleic acids were visualized using ethidium bromide and UV light.

Results

High molecular weight DNA with a size of >10 kb was present in the sample aspirated using a needle and syringe only. However, large bacterial DNA fractions with a size of >10 kb were retained by the swab and the complete sampler (results not shown).

5. Effect of the Sampling Device or its Components on Bacteria and the Ability to Recover these Bacteria from a Filter Disc The aim of the experiment was to demonstrate absence of retention of bacteria in the sampling device of the present invention upon aspiration of liquid. It was aimed to show a reduction in bacterial load in the filtrate that passed through the 0.8 µm filter to ensure that bacteria are separated from viruses. Finally, it was tested if the 0.8 µm filter could be used to harvest the entrapped bacteria by means of back-flushing with fresh phosphate-buffered saline.

Methods

In a first experiment, an Escherichia coli BL21 strain was grown in Luria-Bertani (LB) medium containing ampicillin. A suspension of the bacterial broth was prepared in PBS and 1 ml of this suspension was collected using (1) sampling device comprising 3 layers of fabric (270, 190 and 80 g/m$^2$), (2) the sampling device in connection to the aforementioned 5 µm and 0.8 µm SFCA filters (3) an 18G needle connected to a syringe as positive control. Suspensions were transferred to 1.5 ml collection tubes and stored on ice. The sampling device was composed of the three layers of polyamide fabrics described before and the first end of the support body comprises a closed tip but had eight round openings in the sidewall. Said round openings were created with a 18G needle (diameter of 1.27 mm).

In the second part of the experiment, the 0.8 µm SFCA filter was separated from the other sampler's components and 1000 µl of fresh PBS was aspirated into a fresh syringe and used to flush back the bacteria in the other direction. This suspension was collected in a 1.5 ml collection tube and stored on ice.

Next, serial 1/10 dilution series were prepared in Luria-Bertani broth for all the samples. These suspensions were inoculated (200 µl) onto petri dishes (58 cm$^2$) containing LB agar containing ampicillin. Sterile glass beads were added and used to spread the inoculum evenly over the agar. Glass beads were removed and petri dished were incubated with the agar turned upside down for 24 hours at 37° C. before counting the number of colony-forming units (CFU). This experiment was independently executed three times.

An ANOVA test was conducted to compare the CFU titers of the different samples. Multiple comparisons between the positive control and the conditions tested were done using the Dunnett's post-test.

Results

Figure 8:
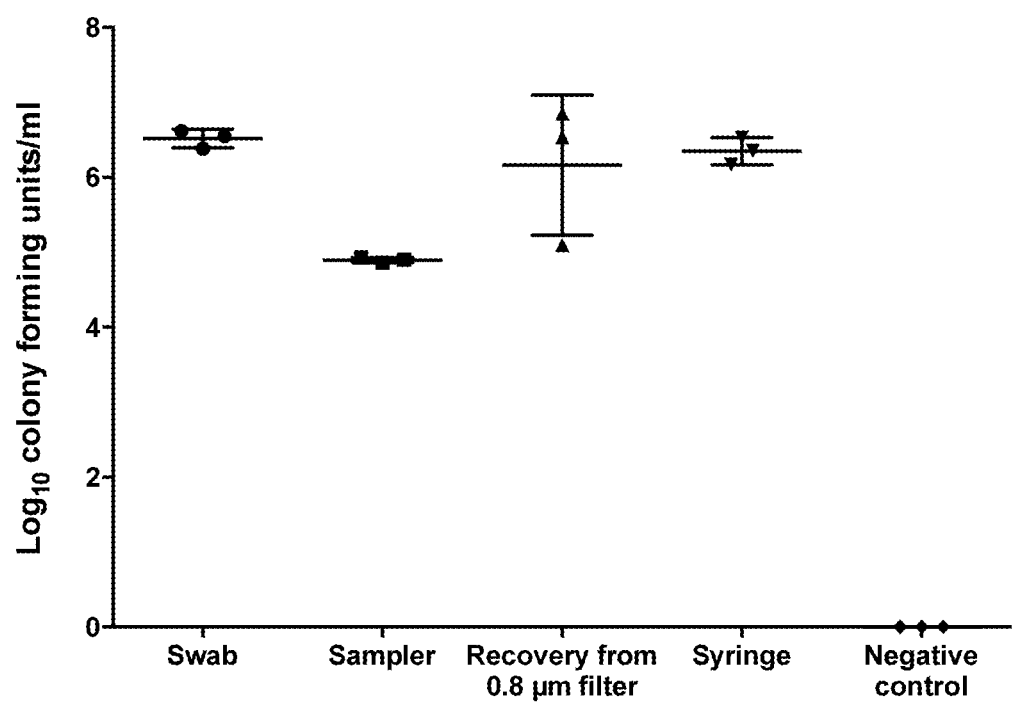
FIG. 8: Influence of the sampling device of the present invention on bacterial load and ability to recover bacteria by back flushing a 0.8 µm SFCA filter. Bacterial loads expressed as $\log_{10}$ colony forming units per ml. Mean±standard deviations of CFU titers obtained during three independent experiments are shown.

The sampling device from the present invention did not have a negative impact on the bacterial load as compared to the positive control (6.52±0.12 vs 6.35±0.18 $\log_{10}$ CFU/ml, no significant difference) (FIG. 8). Using the sampling device in connection the 5 μm and 0.8 μm SFCA filters, only 4.90±0.04 login CFU/ml of bacteria were recovered, resulting in a 28× fold reduction of the bacteria in the filtrate or a mean difference of 1.453 $\log_{10}$ CFU/ml (p-value<0.05). Furthermore, it was possible to flush back the bacteria that were trapped in the 0.8 μm SFCA filter (6.16±0.93 $\log_{10}$ CFU/ml, no significant difference with the positive control).

6. Virus Purification and Enhanced Detection Using the Sampler for Fecal Virus Detection The aim of the experiment was to mimic the sampling of enteric viruses from feces using an in vitro spiking experiment. The performance of the sampling device with a swab tip comprised of 270, 190 and 80 g/m² fabrics in connection to the aforementioned 5 μm and 0.8 μm SFCA filters was compared to a traditional cotton swab. Detection of spiked enteric viruses was executed using virus infectivity titration and real-time PCR.

Methods

Pig manure was collected from the floor of a stable where 6-weeks-old piglets were housed. These piglets received normal pig meal and where healthy. To obtain batches of references feces, the feces was aliquoted in fecal containers and stored at −20° C. until use in spiking experiments.

Two porcine rotavirus strains, RVA/Pig-tc/BEL/12R046/2012/G9P (10^5.93 $CCID_{50}$/ml) and RVA/Pig-tc/BEL/12R050/2012/G5P (10^8.63 $CCID_{50}$/ml) were grown in MA104 cultures and spiked in the reference feces (Theuns et al., 2014, Veterinary Microbiology; Theuns et al., 2015, Journal of Virology). Feces was weighed (1.6 g) and added to a 50 ml falcon tube and spun. Next, 400 μl of undiluted or 1/10 diluted rotavirus stocks were spiked on top of the feces and vortexed during 15 s, following by brief centrifugation to settle the feces in the bottom of the tube.

From each tube, a sample was collected first using a traditional cotton swab tip and transferred to a 15 ml collection tube (condition A) containing 4 ml of transport medium. Next, the sampling device comprising three layers of fabrics was used to collect fecal material and transferred to another collection tube containing 4 ml of transport medium (condition B). The swab-tips were both rubbed for 5 s against the wall of the collection tube, resulting a proper fecal suspension. Next, 1 ml of the fecal suspension was collected from the tube of condition A using a polystyrene serological 1 ml pipet (Greiner Bio One). Next, the sampling device was connected to 5 μm and 0.8 μm SFCA filters and a syringe to aspirate the fecal suspension from the collection tube of condition B. Both fecal suspensions were transferred to a sterile 1.5 ml tube and stored on ice until further processing. These experiments were independently repeated three times.

The suspensions collected under both conditions A and B were titrated immediately in MA104 cells to determine the virus infective titer. Cytopathogenic effect was assessed after 4-5 days with a light microscope and titers were calculated using the formula of Reed and Muench.

Part of the sample was used for viral lysis and purification of the viral nucleic acids with the QIAamp Cador Pathogen Mini Kit (Indical) following the instructions of the manufacturer. Rotavirus A genome copies were quantified using an in-house RT-qPCR targeting the NSPS gene segment (Theuns et al., 2014, Veterinary Microbiology).

Results

Figure 9:
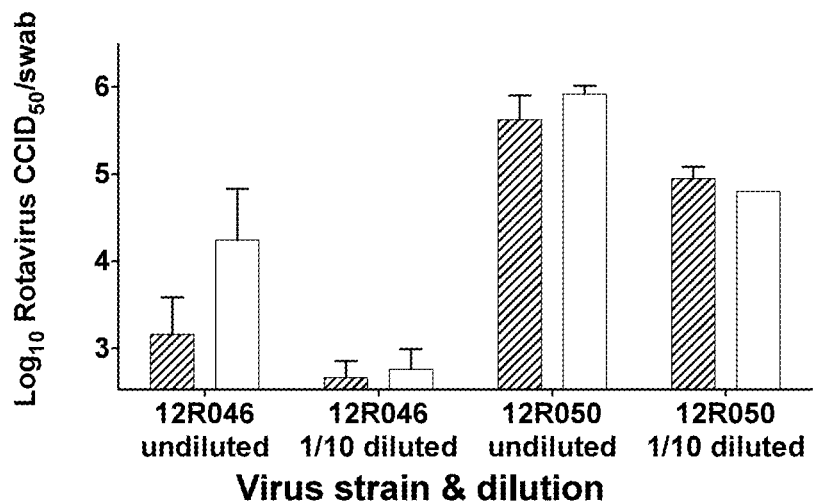
FIG. 9: Rotavirus load upon spiking of two dilutions in feces and sample collection with a cotton swab (black) and the sampler of the present invention (white). Upper panel shows the virus infectivity in MA104 cells. Lower panel shows the rotavirus genome copies determined with RT-qPCR. Mean±standard deviation of three independent experiments are shown.
Figure 9:
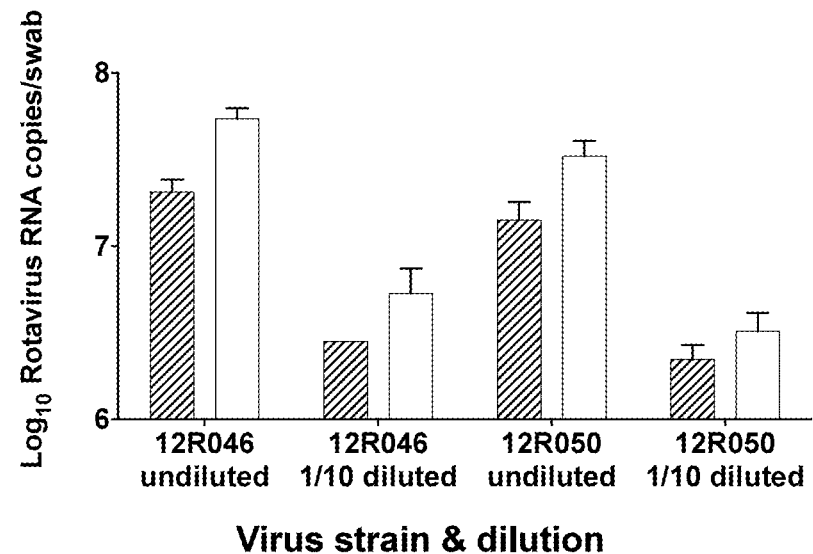
Figure 10:
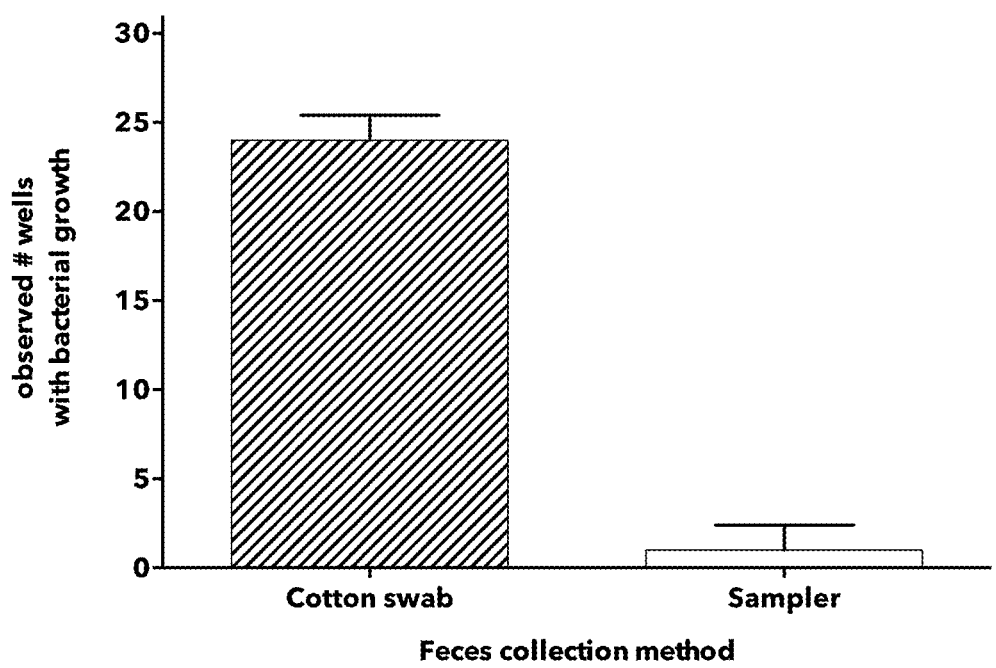
FIG. 10: Number of MA104 cell cultures in which bacterial overgrowth was observed upon inoculation with fecal suspensions collected with a traditional cotton swab or the sampling device of the present invention. Mean±standard deviation of three independent experiments are shown.

The results of the infectivity titration and genome copy quantification are shown in FIG. 9. There was a trend towards higher sensitivity of the sampling device of the present invention compared to the traditional swab when rotavirus was titrated, although the difference between both sampling methods was not statistically significant (p=0.3016). However, an interesting side-effect was observed during light microscopy analyses of the inoculated wells. As feces is rich in bacteria, there is a risk of bacterial overgrowth in wells that are inoculated with dilutions of fecal suspensions. All wells on the plates that contained bacterial overgrowth were counted. A higher number (p=0.0038, unpaired t-test) of wells (n=24±1.414 wells, mean±SD) with bacterial overgrowth was present in the wells inoculated with fecal suspensions collected with a traditional cotton swab compared to filtered samples that were collected using the new complete sampler (n=1±1.414) of the present invention (FIG. 10). This is an advantage when viruses need to be isolated from feces in order to be able to expand the strain e.g. for future vaccine development in human or veterinary medicine or direct production of autovaccines in veterinary medicine.

Importantly, the sensitivity of virus quantification using real-time PCR was significantly improved (p=0.0124, paired t-test) for the samples collected with the sampler of the invention compared to samples collected with a traditional cotton swab (mean±SD of differences=0.3038±0.1141 $\log_{10}$ rotavirus A genome copies/swab). This leads to more accurate and sensitive detection/quantification of viruses in feces. Most enteric viruses are shed at high viral loads, but examples such as poliovirus in human medicine require sensitive tools as they pose an extremely high public health risk.

7. Virus Purification and Enhanced Detection Using the Sampler for Viruses in Mucus The aim of the experiment was to mimic the sampling of respiratory viruses from respiratory mucus using two in vitro spiking experiments.

In a first experiment (FIG. 11A), the performance of the sampling device in connection to the aforementioned 5 μm and 0.8 μm SFCA filters was compared to a traditional cotton swab.

In a second experiment (FIG. 11B), a comparison was done between collection of the respiratory mucus using the sampling device (condition C), the sampling device with 5 μm and 0.8 μm SFCA filters (condition B) and cotton swabs (condition A).

In both experiments, detection of the spiked viruses was conducted using virus infectivity titration in respective host cell lines.

Methods

Pig respiratory mucus was isolated from tracheas that were collected at a Belgian slaughterhouse. Mucus was collected by scraping over the tracheal mucosa with the back of scalpel blade as previously described. Mucus was transferred to 1.5 ml tubes and stored at −70° C.

In the first experiment, mucus (0.5 cm²) was spiked on the bottom of a 6-well culture plate (Nunc). The porcine respiratory viruses PRRSV, influenza virus and adenovirus were used for spiking in different experiments. Undiluted (0) and diluted (−1=1/10, −2=1/100, −3=1/1000) virus stocks were spiked (100 μl of volume) on the mucus and collected using a traditional cotton swab (condition A) or the sampler from the present invention (condition B) and transferred to separate 15 ml collection tubes containing 4 ml of transport medium. The swabs were rubbed for 5 s against the wall of the collection tube, resulting in proper mucus suspension. Next, 1 ml of the mucus suspension was collected from the tube of condition A using a polystyrene serological 1 ml pipet. Next, the complete sampler (swab, filters and syringe) was used to aspirate the mucus suspension from the collection tube of condition B. Both fecal suspensions were transferred to a sterile 1.5 ml tube and stored on ice until further processing. Three independent experiments were conducted for each virus, followed by immediate virus titration in the respective host cell lines.

In the second experiment, the same approach was followed as in the first experiment but now the mucus was spiked with influenza virus and collected with a cotton swab (condition A), the sampler from the present invention (condition B), or the sampling device alone (condition C). Again, the swabs were transferred to separate 15 ml collection tubes containing 4 ml of transport medium and rubbed for 5 s against the wall of the tube to resuspend the mucus. Next, 1 ml of the mucus suspension was collected from the tube of condition A using a polystyrene serological 1 ml pipet. Next, the complete sampler (swab, filters and syringe) was used to aspirate the mucus suspension from the collection tube of condition B. Finally, the swab was used to directly aspirate the mucus suspension from the collection tube of condition C.

Results

Figure 11A:
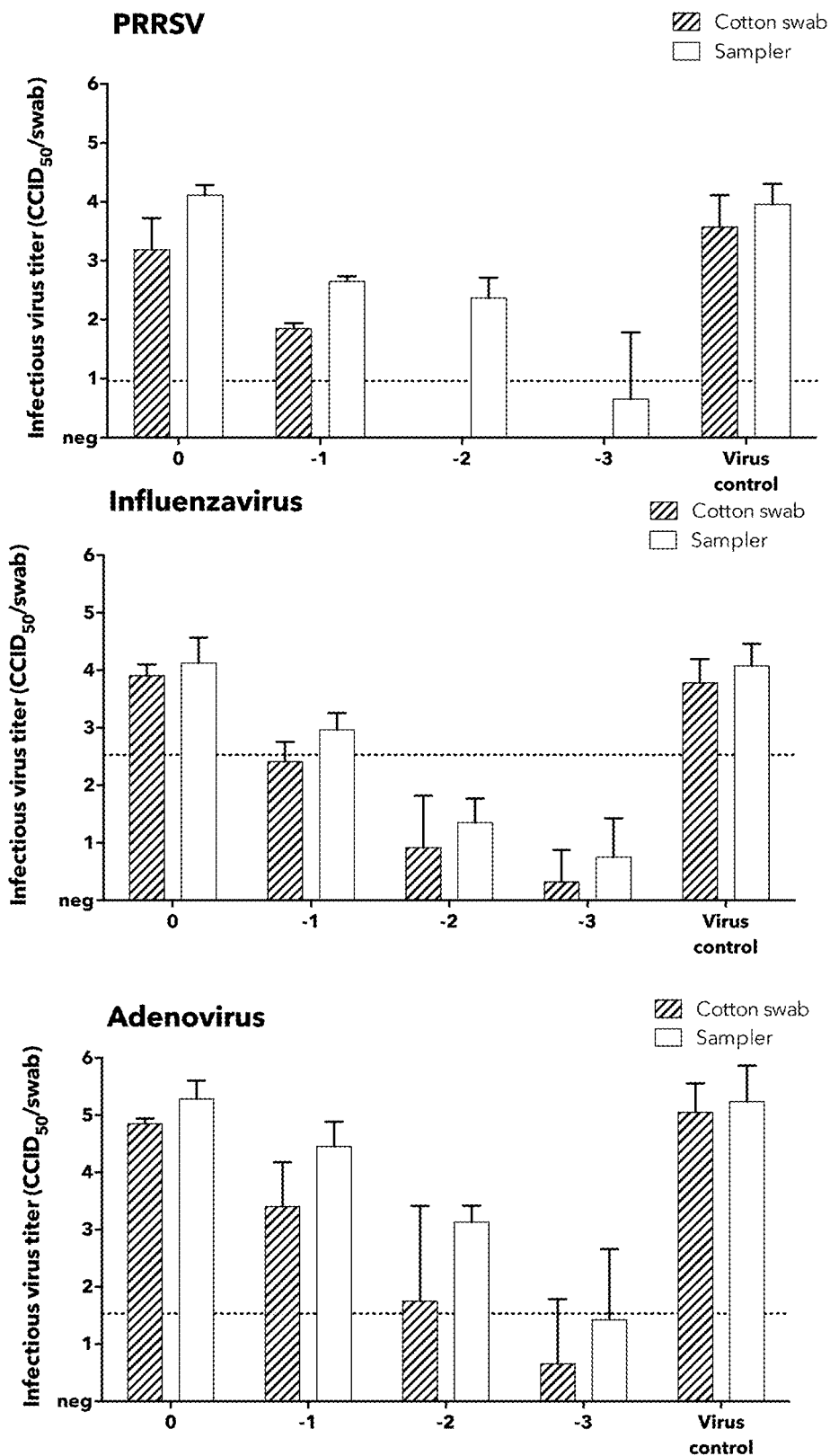
FIGS. 11A, 11B.
Figure 11B:
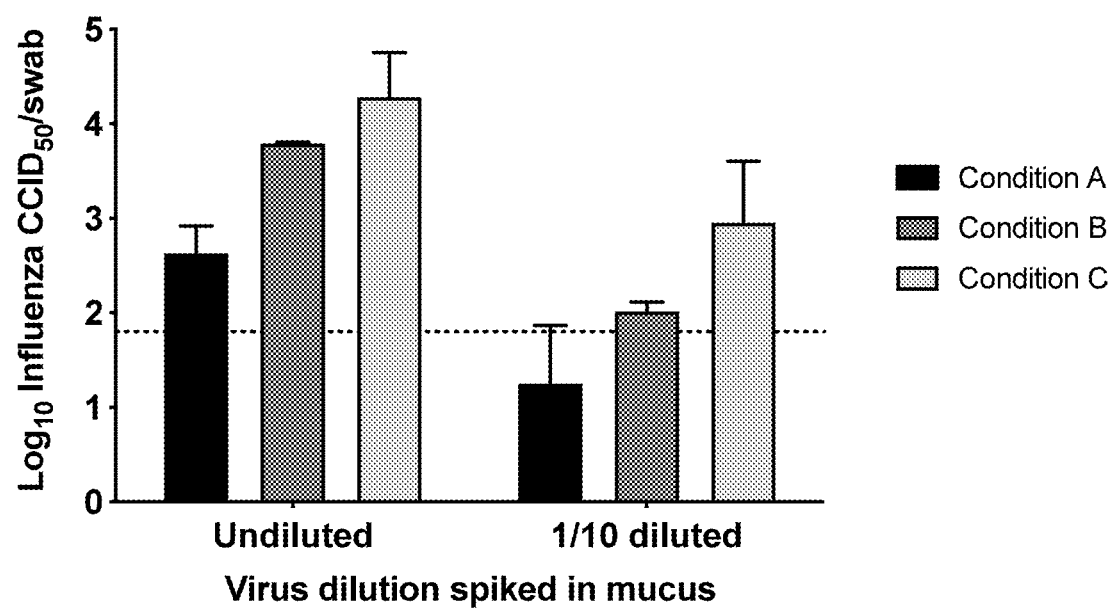

In the first experiment, all mucus that was brought into the 6-well plate was efficiently collected by using the sampler from the present invention to collect the sample. A small fraction of mucus was still left using the traditional cotton swab, demonstrating a lower collection capacity. Remarkably and as shown in FIG. 11A, use of the sampler compared to a traditional cotton swab leads to higher sensitivity and less variation in downstream virus infectivity titration of PRRSV (p=0.0420; mean difference±standard deviation: 1.023±0.7758 $CCID_{50}$/swab), influenza virus (p=0.0027; mean difference±standard deviation: 0.3880±0.1315 $CCID_{50}$/swab) and porcine adenovirus (p=0.0229; mean difference±standard deviation: 0.7627±0.4749 $CCID_{50}$/swab). Interestingly, infectious virus was not detected by the cotton swab upon collection and titration of mucus samples spiked with low loads of PRRSV (1/100 and 1/1000 diluted), while virus infection was seen for the 1/100 virus dilution (3/3 replicates) and the 1/1000 dilution (1/3 replicates) when the sampler of the present invention was used.

In the second experiment (FIG. 11B), the virus infectivity of influenza virus was compared between mucus suspensions collected with a cotton swab, the complete sampling device with two syringe filters and a collection tube, and the device with only the swab tip and the support body. Influenza virus infectivity was higher in mucus suspensions collected with the device comprising the swab tip and support body alone, compared to mucus suspensions that were collected with the complete sampling device or a cotton swab, in that order.

8. Virus Purification and Enhanced Detection Using the Sampler for Virus Detection in Blood In this experiment, PRRSV was spiked in blood and samples were analyzed with real-time PCR to compare differences in the collection methods used.

Methods

Whole swine blood was collected from healthy donor animals using heparin and spiked with different dilutions (undiluted, 1/10, 1/100 and 1/1000 v/v) of PRRSV strain 13V091. Eight hundred microliters of the spiked blood were brought in 3200 µl of storage buffer, composed of UP and antibiotics as described above. The blood was swirled to mix. One ml was collected using a sterile 1 ml serological pipet (Greiner Bio One). The remaining suspension was filtered using the swab and the syringe filters. Viral RNA was released from the virions and purified using the QIAamp Cador Pathogen Mini Kit according to the manufacturer's instructions. PRRSV viral genomes were quantified using an in-house real-time PCR.

Results

FIG. 12 shows the results of PRRSV detection upon collection of blood lysates with the sampler of the invention on the one hand and a standard serological pipet on the other hand.

Using the sampler, a slight increase is shown in detection of PRRSV genome copies in samples containing undiluted and diluted (1/10 and 1/100 diluted) virus stock. No viral genomes were detected in the sample that was spiked with a 1/1000 dilution of the virus stock, which could indicate that blood is a more difficult matrix.

9. Virus Stability after Collection from Mucus and Feces with Sampler and Storage for Several Days During transport it is essential that virus integrity is retained. Mucus and feces were collected using the sampling device of the invention, resuspended in storage buffer and followed by either purification or no purification and storage of several days at 4° C. Infective virus titers were determined to evaluate possible effects of virus purification and time on virus infectivity.

Methods

Influenza virus Ghent/28/10 (Qiu et al., 2015, Veterinary Research) was thawed and centrifuged at 13,000 rpm for 3 min. The supernatant was collected and a 1/10 v/v virus dilution was prepared in storage buffer composed of ultrapure water, penicillin, streptomycin, gentamycin and amphotericin B. Respiratory mucus, collected and stored as described above, was thawed on ice. Mucus (0.25 cm$^2$) was spiked on the bottom of a 6-well cell culture plate and 200 µl of virus suspension was added. The spiked mucus was collected using the new swab and immersed in 4 ml of storage buffer to generate a mucus suspension. One ml of the suspension was collected using a serological 1 ml pipet, whereas the remaining suspension was aspirated through the sampling device comprising three layers of fabrics and in connection with the aforementioned 5 µm and 0.8 µm SFCA filters to purify the viral particles. Negative controls were included by spiking mucus with storage buffer instead of virus or by collection storage buffer.

All samples were stored at 4° C. for zero, one or two days followed by immediate titration in MDCK cells. The experiment was executed independently three times. CPE was read after 7 days using a light microscope and virus infectivity titers were determined using the formula of Reed and Muench. A repeated measures two-way ANOVA was used to determine effects of purification and time on virus infectivity.

A similar experiment was executed by spiking rotavirus strain RVA/Pig-tc/BEL/12R050/2012/G5P in feces (Theuns et al., 2014, Veterinary Microbiology). Rotavirus was thawed and centrifuged at 13,000 rpm for 3 min. The supernatant was collected and a 1/10 v/v virus dilution was prepared in storage buffer. Feces was collected and stored as described above and 1.6 g was weighed in 50 ml falcon tubes. The virus suspension (400 µl) was spiked on the feces, vortexed for 15 sec to ensure proper mixing and then briefly spun to obtain the feces in the bottom of the tube. Feces was collected using the swab of the invention and immersed in 4 ml of storage buffer in 15 ml collection tube. One ml of the fecal suspensions was collected using a serological 1 ml pipet, whereas the remaining suspension was filtered using the sampling device from the present invention. Samples were stored at 4° C. during zero, one or two days. Titration was performed in MA104 cells and CPE was read after 4 to 5 days using a light microscope. Infectious virus titers were determined using the formula of Reed and Muench. A repeated measures two-way ANOVA was used to determine effects of purification and time on virus infectivity.

Results

Influenza virus was spiked in mucus and collected using the swab tip from the present invention. FIG. 13 shows that purification of influenza virus particles from mucus using the sampling device and a series of syringe filters has an impact (p=0.0100) on the virus infectious titers. Time of storage did not have significant impact (p=0.4187) on virus titers after storage. These results show that influenza virus is relatively stable in the storage buffer at 4° C. In addition, purifying the virus from mucus leads to higher infectious virus titers, meaning that some inhibitory substances (e.g. acidic polysaccharides, sialic acids . . . ) are filtered out.

Rotavirus was spiked in feces and was stable after storage for 0 to two days at 4° C. (FIG. 14). No significant effect (p=0.3594) of storage time on infectivity was seen. Furthermore, purification did not significantly (p=0.2514) enhance the infectivity or stability of the virus.

10. Implementation of the Sampler in a Viral Metagenomics Sequencing Workflow

In this experiment, three different sample matrices, including feces and mucus, were spiked with representative viruses and analyzed using viral metagenomics sequencing. Here, the sampling device in connection to a series of 5 µm and 0.8 µm SFCA filters was used to collect biological specimens after transfer into a liquid. The resulting filtrates were immediately processed for sequencing and compared to a more extended, validated laboratory protocol for viral enrichment (Novel Enrichment Technique of Viromes (NetoVIR)). Typically, laboratory viral metagenomics protocols make use of several time-consuming handling steps (e.g. shown in Table 4) and require specialized equipment for homogenization, centrifugation, filtration and nuclease treatment. Each handling/step can lead to errors (e.g. cross-contamination, pipetting mistakes . . . ) and may lead to bias inherent to the used processing step. Here, the aim was to demonstrate the direct applicability of our sampling device in a diagnostic viral metagenomics workflow. This can save up to half a day of workload.

TABLE 4

Time-saving using sampling device to purify viruses for downstream metagenomics sequencing

| | Time needed (h) to process a batch of 10 samples using a laboratory viral enrichment protocol instead of on-site purification with sampling device |
|---|---|
| Sample weighing/ resuspension when no swabs are used | 1 h |
| Homogenization | 15 min |
| Centrifugation | 15 min |
| Filtration | 15 min |
| Nuclease treatment (2 h) | 2 h 15 min |
| Total | 3 to 4 h |

Methods

In this study, three different matrices were spiked with representative viruses:

feces/enteric: rotavirus A (7.93 log 10 CCID50/g feces) and PEDV (4.13 log 10 CCID50/g feces);

mucus/respiratory: PRRSV (5.30 log 10 CCID50/0.25 cm2 mucus) and PRV (7.80 log 10 CCID50/0.25 cm2 mucus);

Feces and mucus were collected using the sampling device and transferred to a collection tube with 4 ml of storage buffer per tube.

To process the sample with the NetoVIR viral metagenomics protocol, one ml of each suspension (sample series A) was collected using a sterile serological one ml pipet and transferred to a fresh 1.5 ml collection tube. The remaining suspension was aspirated using the sampling device in connection to the series of aforementioned SFCA filters (sample series B).

The unfiltered suspensions from sample series A were processed using a protocol modified from the NetoVIR strategy for viral enrichment of samples for metagenomics studies using Illumina sequencing (Conceicao-Neto et al., 2015, Scientific Reports). The protocol consisted of a centrifugation step (13,000 rpm for 3 min at room temperature), followed by filtration of the supernatant through a 0.8 µm surfactant-free cellulase acetate filter and subsequent nuclease treatment of the filtrate for 2 h at 37° C. (Benzonase Nuclease) to discard free-floating nucleic acids. Next, viral nucleic acids were released and purified from the nuclease treated sample (400 µl) using the QIAamp Cador Pathogen Mini Kit according to manufacturer's instructions but without addition of carrier RNA.

The samples from series B did not require additional purification or pretreatment and viral nucleic acids were directly released and purified with the QIAamp Cador Pathogen Mini Kit as described above.

Next, for both workflows, the viral RNA was converted into complementary DNA and subsequently double-stranded DNA was made using the NEBNext Ultra II Non-Directional RNA Second Strand Synthesis Module before sequencing library preparation using the Rapid Barcoding Sequencing Kit (SQK-RBK004) from Oxford Nanopore Technologies on a R9.4 MinION flowcell. The samples were then sequenced for 6 hours on the MinION from Oxford Nanopore Technologies. Viral reads were identified by comparison against an in-house complete viral database.

Results

FIG. 15 shows the number of porcine viruses identified upon processing with the two different methodologies. Using both sample purification methods, all spiked viruses could be detected. In feces, several other viruses (e.g. astrovirus, picornaviruses, picobirnavirus and sapovirus) were also present and detected using both the sampling device and NetoVIR.

In general, more viral reads were acquired when the samples were processed using the NetoVIR protocol. However, using the sampling device of the present invention, a time gain of 3-4 hours could be achieved in this experiment. Moreover, the sampling method showed good sensitivity for downstream sequencing, as also low-abundant viruses such as PEDV spiked in faeces were efficiently diagnosed using the sampling device of the present invention.

11. Purification and Enrichment of Different Pathogens from a Sputum Sample Spiked with a Complex of a Large Number of Pathogens, Including Viruses, Bacteria and Fungi.

Methods

In this experiment, a sputum sample (500 µL) was spiked with a combination of (1) an in house Viral Mock Community (VMC) (50 µL), (2) a Bacterial Mock Community (BMC, ZymoBIOMICS Microbial Community Standard (Zymo Research; D6300)) (50 µL), and (3) *Mycoplasma bovis* (*M. bovis*) PG45 type strain (ATCC 25523) (50 µL). More information on the pathogens tested is given in Table 5. Subsequently, the spiked sputum was diluted in 4 mL dPBS to allow collection with the sampling device and aspirated through the swab tip and a 0.8 μm SFCA filter. In parallel, the unfiltered sputum suspension was processed without filtering for comparison. Both samples were processed using a viral metagenomics workflow, which included a viral nucleic acid isolation using a commercially available kit and random viral nucleic acid amplification followed by sequencing for 12 hours on a MinION. The original sputum sample was also analyzed with a bacterial DNA isolation kit and sequenced to determine the presence of bacteria in the original sample. This experiment allowed to verify the possible use of the sampling device as part of an all-in-one diagnostic workflow for viruses and bacteria.

Results

In this experiment, an increased detection of viral reads was observed when the sample was filtered using the sampling device, compared to direct processing of the sputum suspension. This might be the result of an in increased cDNA and PCR amplification efficiency because of the filtration (FIG. 16A). As the sputum was not only spiked with viruses, but also contained a very high load of bacteria, it may explain why not all members of the viral mock community werd detected. Besides the detection of viral reads, *Mycoplasma bovis* reads were also detected using upon processing with the viral metagenomics workflow. The *M. bovis* load in the filtrate was similar to the load in the original sputum suspension. This enables to immediately combine virus and *Mycoplasma* spp. detection from the filtrate in one analysis (FIG. 16B).

Around 431 bacterial reads (excluding *E. coli* reads) where isolated from sputum suspension in a bacterial metagenomics worfklow using a specific bacterial DNA isolation kit. Interestingly, it was observed that bacterial reads could also be detected in the filtrate when applying the viral metagenomics worfklow with the viral nucleic acid isolation kit. This means that there was a slight passage of bacteria through the 0.8 μm filter, but at a load that is not interfering with the viral detection. Moreover, it even suggests the possibility of usage of the sampling device as part of an all-in-one viral and bacterial diagnostic test. This effect might point to the more efficient removal of potential inhibitors due to the filtration being applied. The composition of bacterial species in all samples was maintained as compared to the unfiltered sputum sample. Furthermore, *Bacillus* sp. reads were detected in the filtrate fraction, which was not possible in the original sputum sample (FIG. 16C). This supports a possible implementation of the sampling device in a broader all-in-one diagnostics approach.

TABLE 5

Overview of species represented in viral and bacterial mock communities

| Community | Species | Genome Size (bp) | GC content (%) | Remarks |
|---|---|---|---|---|
| Viral Mock Community | Feline Panleukopeniavirus Strain 10K413 | 5,323 | 35.6 | ssDNA (+) |
| | Influenzavirus A Strain Sw/Gent/28-10/H1N1 | 13,333 | 43.6 | 8 ssRNA (−) segments |
| | PCV2 Strain Stoon 10/10 | 1,767 | 48.4 | ssDNA (+) circular |
| | PEDV Strain CV777 | 28,029 | 41.8 | ssRNA (+) |
| | Porcine Rotavirus A Strain Pig-tc/BEL/12R046/2012/G9P[23] | 18,034 | 32.0 | 11 dsRNA segments |
| | PRRSV Strain 12V091 | 15,428 | 52.8 | ssRNA (+) |
| | Suid Alphaherpesvirus 1 Strain Bartha | 142,922 | 73.6 | dsDNA |
| Bacterial Mock Community | *Pseudomonas aeruginosa* (B-3509) | 6,792,000 | 66.2 | Gram$^{Negative}$ |
| | *Escherichia coli* (B-1109) | 4,875,000 | 46.7 | Gram$^{Negative}$ |
| | Salmonella enterica (B-4212) | 4,670,000 | 52.2 | Gram$^{Negative}$ |
| | *Lactobacillus fermentum* (B-1840) | 1,905,000 | 52.4 | Gram$^{Positive}$ |
| | *Enterococcus faecalis* (B-537) | 2,845,000 | 37.5 | Gram$^{Positive}$ |
| | *Staphylococcus aureus* (B-41012) | 2,730,000 | 32.9 | Gram$^{Positive}$ |
| | *Listeria monocytogenes* (B-33116) | 2,992,000 | 38.0 | Gram$^{Positive}$ |
| | *Bacillus subtilis* (B-354) | 4,045,000 | 43.0 | Gram$^{Positive}$ |
| | Saccharomyces cerevisiae (Y-567) | 12,100,000 | 38.3 | Yeast |
| | Cryptococcus neoformans (Y-2534) | 18,900,000 | 48.3 | Yeast |
| *M. bovis* | *Mycoplasma bovis* PG45 (ATCC 25523) | 1,003,404 | 29.3 | Cell-wall less bacterium |

REFERENCES

Conceição-Neto N, Zeller M, Lefrère H, De Bruyn P, Beller L, Deboutte W, Yinda C K, Lavigne R, Maes P, Van Ranst M, Heylen E, Matthijnssens J. Modular approach to customise sample preparation procedures for viral metagenomics: a reproducible protocol for virome analysis. Sci Rep. 2015 Nov. 12; 5:16532.

Ellis J, Hassard L, Clark E, Harding J, Allan G, Willson P, Strokappe J, Martin K, McNeilly F, Meehan B, Todd D, Haines D. Isolation of circovirus from lesions of pigs with postweaning multisystemic wasting syndrome. Can Vet J. 1998 January; 39(1):44-51.

Frydas I S, Trus I, Kvisgaard L K, Bonckaert C, Reddy V R, Li Y, Larsen L E, Nauwynck H J. Different clinical, virological, serological and tissue tropism outcomes of two new and one old Belgian type 1 subtype 1 porcine reproductive and respiratory virus (PRRSV) isolates. Vet Res. 2015 Mar. 21; 46:37.

Theuns S, Desmarets L M, Heylen E, Zeller M, Dedeurwaerder A, Roukaerts I D, Van Ranst M, Matthijnssens J, Nauwynck H J. Porcine group A rotaviruses with heterogeneous VP7 and VP4 genotype combinations can be found together with enteric bacteria on Belgian swine farms. Vet Microbiol 2014 Aug. 6; 172 (1-2):23-34.

Theuns S, Heylen E, Zeller M, Roukaerts I D, Desmarets L M, Van Ranst M, Nauwynck H J, Matthijnssens J. Complete genome characterization of recent and ancient Belgian pig group A rotaviruses and assessment of their evolutionary relationship with human rotaviruses. J Virol. 2015 Jan. 15; 89(2):1043-57.

Qiu Y, De Hert K, Van Reeth K. Cross-protection against European swine influenza viruses in the context of infection immunity against the 2009 pandemic H1N1 virus: studies in the pig model of influenza. Vet Res. 2015 Sep. 24; 46:105.

Garré B, van der Meulen K, Nugent J, Neyts J, Croubels S, De Backer P, Nauwynck H J. In vitro susceptibility of six isolates of equine herpesvirus 1 to acyclovir, ganciclovir, cidofovir, adefovir, PMEDAP and foscarnet. Vet Microbiol 2007 May 16; 122 (1-2):43-51.

The invention claimed is:

1. A sampling device for collecting and isolating a biological specimen from a sample or from a location, the sampling device comprising a swab tip and a support body, wherein:
   the support body has a hollow conformation with a first end, a second end opposite the first end, and one or more side walls;
   the first end is in fluid connection with an internal surface of the swab tip;
   the swab tip comprises a filter material with a pore size gradient that decreases from an external surface of the swab tip to the internal surface of the swab tip, wherein the filter material covers the first end and extends down an exterior portion of the one or more side walls of the support body; and
   the support body is configured to collect the sample via the swab tip, transport the sample through the pore size gradient from the external surface to the internal surface, and transport the sample from the first end towards the second end upon application of a negative pressure gradient at the second end.

2. The sampling device according to claim 1, further comprising means for creating a negative pressure gradient through the sampling device, fluidically connected to the second end of the sampling device such that the negative pressure gradient facilitates transport of the sample from the swab tip toward the second end of the support body via the first end of the support body.

3. The sampling device according to claim 1, further comprising an apparatus fluidically connected to the second end of the support body and configured to create a negative pressure gradient through the sampling device that facilitates transport of the sample from the swab tip toward the second end of the support body via the first end of the support body, wherein in the apparatus is chosen from a syringe or syringe plunger device, a suction device, a bulge, an air pumping apparatus, or a vacuum device.

4. The sampling device according to claim 1, wherein the pore size of the filter material is at least 5 μm.

5. The sampling device according to claim 1, wherein the filter material is a single-layered filter material.

6. The sampling device according to claim 1, wherein the filter material is a single-layered filter material with a continuous pore size gradient.

7. The sampling device according to claim 1, wherein the filter material is a multi-layered filter material.

8. The sampling device according to claim 7, wherein the multi-layered filter material has a discontinuous pore size gradient.

9. The sampling device according to claim 7, wherein the pore size of an outer layer of the multi-layered filter material is at least 50 μm.

10. The sampling device according to claim 7, wherein the pore size of an inner layer of the multi-layered filter material is from 5 μm to 50 μm.

11. The sampling device according to claim 1, wherein the filter material is polyamide-based or nylon.

12. The sampling device according to claim 1, wherein the swab tip further comprises a fabric layer on the external surface of the swab tip.

13. The sampling device according to claim 12, wherein the fabric layer comprises pores, the pores of the fabric layer having a pore size of at least 100 μm.

14. The sampling device according to claim 1, wherein:

the first end of the support body terminates in an open or closed tip; and the first end of the support body further comprises one or more openings in the one or more side walls of the support body, wherein the filter material covers the one or more openings.

15. The sampling device according to claim 1, further comprising:

a collection tube that is in fluidic connection with the second end of the support body; and optionally one or more filters that are positioned in between the support body and the collection tube.

16. A method for the collection and/or isolation of a biological specimen from a sample or from a location, the method comprising:

scraping with and/or immersing the external surface of the swab tip of the sampling device of claim 1 in the sample or at the location;

collecting a biological specimen from the sample or the location in the external surface of the swab tip;

optionally bringing the swab tip and the collected biological specimen in a liquid medium;

transferring the biological specimen from the external surface of the swab tip to the internal surface of the swab tip and further into the support body of the sampling device; and collecting the biological specimen in the support body or from the second end of the support body of the sampling device into a collection tube that is fluidically connected with the second end of the support body, wherein the collection and isolation of the biological specimen is performed using a negative pressure gradient that facilitates the transport of the sample from the sample tip toward the second end of the support body via the first end of the support body.

17. The method of claim 16, wherein the biological specimen are bacteria, viruses, parasites, fungi, or combinations thereof.

18. The method of claim 16, wherein the sample is selected from a water sample or a bodily fluid sample.

19. The method of claim 18, wherein:

the sample is a water sample selected from fresh water, salt water, brackish water, or waste water; or the sample is a bodily fluid sample selected from blood, serum, plasma, nasal mucus, sputum, lung aspirate, vaginal fluid, gastric fluid, saliva, urine, feces, cerebrospinal fluid, breast milk, or pus.

20. A kit of parts for assembling the sampling device according to claim 1, the kit of parts comprising:
- the support body;
- the swab tip;
- one or more filters;
- a collection tube;
- optionally, a means for providing a fluid flow or pressure gradient in the sampling device; and
- optionally, a container with collection fluid.

* * * * *